United States Patent
Jarvis et al.

(10) Patent No.: US 11,455,350 B2
(45) Date of Patent: Sep. 27, 2022

(54) SYSTEM, METHOD, AND INTERFACES FOR WORK PRODUCT MANAGEMENT

(75) Inventors: James John Jarvis, Eagan, MN (US); Jeff Arvidson, Eagan, MN (US); Scott Post, Eagan, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 13/368,487

(22) Filed: Feb. 8, 2012

(65) Prior Publication Data
US 2013/0204840 A1     Aug. 8, 2013

(51) Int. Cl.
| | |
|---|---|
| G06F 16/9535 | (2019.01) |
| G06Q 50/18 | (2012.01) |
| G06F 16/18 | (2019.01) |
| G06F 16/16 | (2019.01) |
| G06F 16/178 | (2019.01) |

(52) U.S. Cl.
CPC ........ *G06F 16/9535* (2019.01); *G06F 16/166* (2019.01); *G06F 16/1794* (2019.01); *G06F 16/1873* (2019.01); *G06Q 50/18* (2013.01)

(58) Field of Classification Search
CPC .......... G06F 11/2071; G06F 17/30008; G06F 17/30011; G06F 21/6227; G06F 17/30368; G06F 17/30867; G06F 16/9535; G06F 16/166; G06F 16/1873; G06F 16/1794; G06Q 10/10; G06Q 50/18
USPC ........................ 707/609, 610, 611
See application file for complete search history.

(56) References Cited

U.S. PATENT DOCUMENTS

| | | | |
|---|---|---|---|
| 6,343,313 B1 | 1/2002 | Salesky et al. | |
| 6,678,698 B2 * | 1/2004 | Fredell | G06Q 10/06 707/608 |
| 7,085,755 B2 * | 8/2006 | Bluhm et al. | |

(Continued)

FOREIGN PATENT DOCUMENTS

WO   WO-2012033511 A1 *   3/2012   ........... G06F 16/252

OTHER PUBLICATIONS

PCT International Search Report and Written Opinion of the International Searching Authority for PCT/US2013/024402 dated Oct. 17, 2019.

(Continued)

*Primary Examiner* — Matthew J Ellis
(74) *Attorney, Agent, or Firm* — Antonio Papageorgiou; Lombard & Geliebter LLP

(57) ABSTRACT

A method includes receiving an initial electronic file where the initial electronic file is associated with a work product. The method further includes resolving, automatically, an electronic file content type associated with the initial electronic file and executing, automatically, at least one subscription program associated with the electronic file content type of the initial electronic file. The method further includes retrieving an enhanced electronic file based on a matter security level. The enhanced electronic file is associated with an indication of completion of the at least one subscription program. Another embodiment includes extracting a set of metadata from the initial electronic file and storing the set of metadata from the initial electronic file in a memory. Yet another embodiment includes populating, automatically, at least one field within a field-oriented electronic file from the set of metadata.

19 Claims, 39 Drawing Sheets

(56) References Cited

U.S. PATENT DOCUMENTS

| | | | | |
|---|---|---|---|---|
| 7,237,008 | B1* | 6/2007 | Tarbotton | G06Q 10/107 709/206 |
| 7,333,966 | B2* | 2/2008 | Dozier | 706/21 |
| 7,480,644 | B2* | 1/2009 | Bluhm et al. | |
| 7,685,237 | B1 | 3/2010 | Weaver et al. | |
| 7,941,431 | B2* | 5/2011 | Bluhm et al. | 707/736 |
| 8,234,693 | B2* | 7/2012 | Stahl et al. | 726/4 |
| 8,392,472 | B1* | 3/2013 | Gupta | G06F 16/164 707/804 |
| 8,595,182 | B1* | 11/2013 | Nelson | H04L 67/1095 707/602 |
| 8,832,210 | B2 | 9/2014 | Muszynski et al. | |
| 2004/0034860 | A1 | 2/2004 | Fernando et al. | |
| 2004/0083426 | A1* | 4/2004 | Sahu | G06F 17/243 715/224 |
| 2004/0095378 | A1 | 5/2004 | Vigue et al. | |
| 2004/0153456 | A1 | 8/2004 | Charnock | |
| 2005/0132048 | A1 | 6/2005 | Kogan et al. | |
| 2006/0036679 | A1 | 2/2006 | Goodman et al. | |
| 2006/0206490 | A1* | 9/2006 | Schiller | G06Q 10/10 |
| 2007/0133874 | A1* | 6/2007 | Bressan | G06K 9/723 382/181 |
| 2007/0143398 | A1 | 6/2007 | Graham | |
| 2007/0185865 | A1* | 8/2007 | Budzik | G06F 16/248 |
| 2008/0094312 | A1 | 4/2008 | Feigenbaum | |
| 2008/0267505 | A1* | 10/2008 | Dabet | G06F 40/174 382/181 |
| 2009/0083328 | A1* | 3/2009 | Vivona | G06Q 50/18 |
| 2009/0094329 | A1 | 4/2009 | Ambati et al. | |
| 2009/0150431 | A1* | 6/2009 | Schmidt | G06F 16/284 |
| 2009/0157628 | A1 | 6/2009 | Arthursson et al. | |
| 2009/0172101 | A1 | 7/2009 | Arthursson | |
| 2009/0260060 | A1* | 10/2009 | Smith | G06Q 10/10 726/3 |
| 2009/0287685 | A1 | 11/2009 | Charnock | |
| 2010/0030618 | A1 | 2/2010 | Green et al. | |
| 2010/0070503 | A1 | 3/2010 | Abraham | |
| 2010/0058202 | A1 | 4/2010 | Rostom | |
| 2010/0161460 | A1* | 6/2010 | Vroom et al. | 705/31 |
| 2010/0299187 | A1* | 11/2010 | Duggal | 705/14.1 |
| 2010/0306180 | A1* | 12/2010 | Johnson et al. | 707/695 |
| 2011/0184935 | A1* | 7/2011 | Marlin | G06Q 50/10 707/719 |
| 2012/0036125 | A1* | 2/2012 | Al-Kofahi et al. | 707/728 |
| 2013/0014023 | A1 | 1/2013 | Lee et al. | |
| 2013/0031100 | A1 | 1/2013 | Graham et al. | |
| 2013/0111336 | A1* | 5/2013 | Dorman | G06F 9/4843 715/255 |
| 2013/0212250 | A1* | 8/2013 | Kleppner | G06Q 10/10 709/224 |
| 2014/0033192 | A1* | 1/2014 | Lorenz | G06F 9/4443 717/171 |

OTHER PUBLICATIONS

PCT International Search Report and Written Opinion of the International Searching Authority for PCT/US2014/011826 dated Jun. 20, 2014.

* cited by examiner

Home | Matters | Documents | Contacts | Matter ▼

All Matters | Multi-touch Device Patents | Edit Matter

Open since 8/22/2011 (7 days) | Close Matter

Co File #: 2001000009
Substantive Law: Patent
Organizational Unit: Corporate

Notes
+ Add Note
Contacted technology expert Jennifer Walsh. Uploaded three documents.
Jeff Arvidson | 10/22/2011

This matter is regarding multi-touch device patents for the global technology group.
Jeff Arvidson | 10/19/2011

Participants
Jeff Arvidson
Lead Company Contact
Acme Corporation

James Jarvis
Lead Firm Contact
Dorsey & Whitney

Shannon O'Brien
Participant
Acme Corporation

Associated Parties
Anderson, Cohen LLC.
Adverse Law Firm

John Hall
Judge

Jennifer Walsh
Technology Patent Expert

Matter Details
Documents
Matter History

Home | Matters | Documents | Contacts  Everything ⌄

Multi-touch Device Patents – RRT 213 is closed. You can access closed matters from the Archive in the Matter Directory.

900

Edit Matter

Matter Details

All Matters > Multi-touch Device Patents

Open since 8/22/2011 (7 days) | Close Matter

Co File #: 2001000009

Substantive Law: Patent

Organizational Unit: Corporate

Documents

Notes

Contacted technology expert Jennifer Walsh. Uploaded three documents.

Jeff Arvidson | 10/22/2011

+ Add Note

This matter is regarding multi-touch device patents for the global technology group.

Jeff Arvidson | 10/19/2011

Matter History

Participants

Jeff Arvidson
Lead Company Contact
Acme Corporation

James Jarvis
Lead Firm Contact
Dorsey & Whitney

Shannon O'Brien
Participant
Acme Corporation

Associated Parties icon  Anderson, Cohen LLC.
Adverse Law Firm

John Hall
Judge

Home | Matters | Documents | Contacts

All Matters | Multi-touch Device Patents    Edit Matter

Everything »    [search]

Matter Details

Closed since 8/22/2011 (7 days) | Re-open Matter

Co File #: 2001000009
Substantive Law: Patent
Organizational Unit: Corporate

Documents

Notes

Contacted technology expert Jennifer Walsh. Uploaded three documents.

Jeff Arvidson | 10/22/2011

This matter is regarding multi-touch device patents for the global technology group.

Jeff Arvidson | 10/19/2011

Matter History

Participants

Jeff Arvidson
General Counsel | Acme Corp
Owner/Lead Company Contact

James Jarvis
Co-owner/Lead Firm Contact
Dorsey & Whitney

Shannon O'Brien
Reviewer
Acme Corporation

Associated Parties

Anderson, Cohen LLC.
Adverse Law Firm

John Hall
Judge

Jennifer Walsh
Technology Patent Expert

Matter Details > Basic

Matter Details

Basic Matter Details

1200

Short Name
Allied Manufacturing

Full Name
Allied Manufacturing

Notes

Participant                    + Add

James Jarvis | Participant ▼   Owner

Organizational Unit

Corporate ▼

Substantive Law

General Rep/ Counseling ▼

Additional Matter Details ▸

Associated Parties ▸

Save   Cancel

FIGURE 12

Matter Details > Additional Matter Details

Matter Details

Basic Matter Details

Additional Matter Details

Co File Number

Budget

State    Country
CA ▼    United States

Associated Parties

Save   Cancel

Matter Details > Associated Participants

Matter Details

Basic Matter Details
Additional Matter Details
Associated Parties

Adverse Law Firm

Associated Participant
None selected

+ Add

Save   Cancel

Matter Details

Basic Matter Details

Short Name: Allied Manufacturing

Full Name: Allied Manufacturing

Notes:

Participant [+ Add]

| James Jarvis | Participant ▼ | | Owner |
| Glen Andersen | Participant ▼ | | Reviewer ▼ ✕ |
| Derrick Rose | Lead Co Contact ▼ | | Co-owner ▼ ✕ |
| Michael Jordan | Lead Firm Contact ▼ | | Reviewer ▼ ✕ |

Organizational Unit

Corporate ▼

[Save] [Cancel]

GLOBAL SEARCH

[ Everything ▼ | Mayo Clinic                                    x | Search ]

| | |
|---|---|
| All Results | 76 |
| Matters | 12 |
| Documents | 32 |
| Emails | 20 |
| Contacts | 12 |

76 results for "Mayo Clinic"

Matters (12)

Demand Letters (Mayo Clinic)
Litigation: Brief summary / longer description of the matter : Open (1/10/2010) : 35345-5345

Foreclosure (General Bank of Saint Cloud)
Foreclosure: Brief summary / longer description of the matter / brief summary / longer description of matter : Open (11/1/2009) 45345-5323

Demand Letters (Mayo Clinic)
Litigation: Brief summary / longer description of the matter : Open (1/10/2010) : 35345-5345

REMAINING MATTERS

Documents (32)

☐ 4-30-2011 Baker Deposition.doc
320-4594 : Added by Steve Fischer : Updated 3/13/2011
... Quisque eget felis at diam vulputate Mayo Clinic posuere eu ac felis. Nunc placerat pharetra augue. Nunc ...
... ultricies justo sit amet magna Mayo Clinic sit amet gravida dolor rutrum. Suspendisse id ligula ipsum. Proin nec turpis ac nibh gravida congue. ...

☐ 4-30-2011 Baker Deposition.doc
320-4594 : Added by Steve Fischer : Updated 3/13/2011
... Quisque eget felis at diam vulputate Mayo Clinic posuere eu ac felis. Nunc placerat pharetra augue. Nunc ...

☐ 4-30-2011 Baker Deposition.doc
320-4594 : Added by Steve Fischer : Updated 3/13/2011
... Quisque eget felis at diam vulputate Mayo Clinic posuere eu ac felis. Nunc placerat pharetra augue. Nunc ...

REMAINING DOCUMENTS

Emails (20)

✉ Please review
From: Steve Fischer : To: Donald Hayden : Sent: 3/13/2011 3:23 PM : Matter: 320-4594
... about user roles and permissions ...
Baker Construction/4594 Litigation Depositions and Trial Documents ✉ Permissions -- Workbench-Orion Overview.pdf
From: Steve Fischer : To: Donald Hayden : Sent: 3/13/2011 3:23 PM : Matter: 320-4594
... Users and roles for this matter ...
Baker Construction/4594 Litigation Depositions and Trial Documents

Contacts (12)

Mayo Clinic
200 First Street S.W., Rochester, MN 55905 : 507-284-2511 : mayo@mayoclinic.com Austin Medical Center Mayo Health System Orthopedic & Rehabilitation Center
100 1ˢᵗ Dr NW, Austin, MN 55912 : 507-433-7351 : amc@mayoclinic.com

GLOBAL HEADER

Everything ▾ | Mayo Clinic | × | Search

| | |
|---|---|
| All Results | 76 |
| Matters | 12 |
| Documents | 32 |
| Emails | 20 |
| Contacts | 12 |

Narrow your results

Document Facets 32 results for "Mayo Clinic" in Documents

Motion for leave to amend pleading.pdf
Author: Phil Lerner : Created: 3/2/2011 : Matter: 1500-0002
... Rochester has a contract with the Mayo Clinic whereby the Mayo Clinic provides ...

4-27-2011 tire blowout reconstruction interview.doc
Author: Phil Lerner : Created: 4/28/2011 : Matter: 320-4594
... was hospitalized at Mayo Clinic Health System in Eau Claire. ...

Jewson v. Mayo Clinic
United States Court of Appeals, Eighth Circuit. : October 22, 1982 : 691 F.2d 405 : Case
...Discovery was completed and Mayo Clinic renewed its motion for summary judgment...

Visitation Schedule.doc
Author: Sarah Jones : Created: 3/2/2011 : Matter: 1400-0494
... to schedule appointments with physicians and specialists from Mayo Clinic and other medical centers in Wabasha ...

Motion for leave to amend pleading.pdf
Author: Phil Lerner : Created: 3/2/2011 : Matter: 1500-0002
... Rochester has a contract with the Mayo Clinic whereby the Mayo Clinic provides ...

4-27-2011 tire blowout reconstruction interview.doc
Author: Phil Lerner : Created: 4/28/2011 : Matter: 320-4594
... was hospitalized at Mayo Clinic Health System in Eau Claire. ...

Jewson v. Mayo Clinic
United States Court of Appeals, Eighth Circuit. : October 22, 1982 : 691 F.2d 405 : Case
...Discovery was completed and Mayo Clinic renewed its motion for summary judgment...

Visitation Schedule.doc
Author: Sarah Jones : Created: 3/2/2011 : Matter: 1400-0494
... to schedule appointments with physicians and specialists from Mayo Clinic and other medical centers in Wabasha ...

Jewson v. Mayo Clinic
United States Court of Appeals, Eighth Circuit. : October 22, 1982 : 691 F.2d 405 : Case
...Discovery was completed and Mayo Clinic renewed its motion for summary judgment...

Visitation Schedule.doc
Author: Sarah Jones : Created: 3/2/2011 : Matter: 1400-0494
... to schedule appointments with physicians and specialists from Mayo Clinic and other medical centers in Wabasha ...

[1] [2] [3] [4]　　Results: 10/page

Home | Matters | Documents | Contacts

Everything ▼

3300

My WestlawNext Research

🔍 Search WestlawNext

All States | Select Jurisdiction

📄 Corestar Intern. Pte. Ltd. V. LPB Communications, Inc.
U.S. District Court, D. New Jersey — 513 F.Supp.2d 107 | May 10, 2007
September 14, 2011 | 5:45 PM
RFID Research License — JKL876

📄 Target Acquisitions, Inc. 10-K Form filed 02/11/11
September 11, 2011 | 10:32 AM
Wall Department Stores - TRE323

📄 Corestar Intern. Pte. Ltd. V. LPB Communications, Inc.
U.S. District Court, D. New Jersey — 513 F.Supp.2d 107 | May 10, 2007
September 10, 2011 | 9:34 AM
Acme Communications — JHY352

⚥ force majeure flood hurricane delay New Jersey State & Federal
September 9, 2011 | 2:20 PM
Kwik Gas — REW123

📄 Google Inc. 10-Q – EX-31.01, Certification of CEO Pursuant to Rules 13A-14(A) and 15D-14(A) filed 07/27/11
September 6, 2011 | 3:12 PM
Worldwide Computers-POR568

View More in WestlawNext

- Notifications
- Recent Documents
- Reports
- WLN Research

My Recent Matters    New Matter

Accounting Tax Restructure — IRE903

Building Leases — RTI089

Fall 2011 Advertising Campaign — BKO123

Product Research & Development — JIO098

Name of matter goes here

Name of matter goes here

Name of matter goes here

Name of matter goes here

Name of matter goes here

Name of matter goes here

My Products

WestlawNext

FIGURE 33

Home | Matters | Documents | Contacts

← 3500

Everything ▼

Notifications

Dismiss All

Added to matter:
Acme Computers License Agreement – BBY876
October 21, 2011

Dismiss

Added to matter:
Chicago Leases – RTI089
October 18, 2011

Dismiss

New folder created: Litigation Documents
Ireland Tax Restructure – IRE903
October 11, 2011

Dismiss

Notifications (3)

Recent Documents

WLN Research

New Matter

My Recent Matters

Accounting Tax Restructure – IRE903

Building Leases – RTI089

Fall 2011 Advertising Campaign – BKO123

Product Research & Development – JIO098

Name of matter goes here

Name of matter goes here

Name of matter goes here

Name of matter goes here

Name of matter goes here

Name of matter goes here

My Products

WestlawNext

FIGURE 35

SYSTEM, METHOD, AND INTERFACES FOR WORK PRODUCT MANAGEMENT

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2011 Thomson Reuters.

TECHNICAL FIELD

Various embodiments of the present invention concern systems, methods and interfaces for managing customer work product.

BACKGROUND

Today, an individual may receive information from multiple devices. For example, Tina, a corporate attorney, has a home computer where she checks her personal email account and shops online. Tina also has a smartphone where news feeds about the day's events are being streamed to the device every few seconds/minutes. Additionally, Tina has a work laptop where she produces work product (e.g., spreadsheets, documents and work emails) for a product liability legal matter. In addition to managing the multiple devices, Tina also has to manage the multiple products, applications and features on each device. For instance, within Tina's work laptop is a word processing application, a work email application, a personal email application, a billing application, a budget application, a record management application and a calendaring application. Consequently, several of these applications contain information about the same work product. For example, while working on a product liability legal matter, she receives emails from outside counsel about the matter, views the matter details within the record management application, and receives bills for outside counsel's time via the billing application. All of the above is in addition to the work product Tina produces on her laptop via her email accounts and word processing application regarding the product liability matter.

A holistic management system is needed to handle all the devices, sources and applications that an individual must interact with on a daily basis. One known approach is a matter (i.e., work product) management system. This matter management system attempts to incorporate the significant applications, tools and products needed to effectively manage a matter. Returning to the previous example, a matter management system may help Tina save, organize, search, and share information, documents, and communications relevant to a Tina's work product. However, this matter management system may not allow Tina to use the applications with which she is familiar. For example, she may use Google® Gmail as her work email account provider. Using this matter management system, she may have to switch to a different email account provider if the system does not support Google® Gmail.

On the other hand, if the known matter management system is flexible enough to handle various different email account providers, for example, then an additional concern may arise regarding the inability of various applications to share information. For instance, Tina now has a matter management system that includes all her preferred applications. However, the matter management system does not automatically associate a word processing document to a matter. The association has to be provided by Tina. In other words, the matter management system does not have the benefit of utilizing the full breadth of functionality amongst all the applications to enhance a user's work product. Referring to the previous example, Tina may have multiple applications at her fingertips in the matter management system but these applications may not work together to enhance Tina's and/or other individual's work product. Since the known matter management system cannot support multiple applications working together to enhance a document, the system also does not recognize the benefit of extracting and storing information and associated relationships in a central location (i.e., repository). Furthermore, the known system may not be able to retrieve that extracted information from one document and use it to populate another document.

The integration and communication of the applications within a work product management system, in addition to having the ability to enhance one document and populate another document with information from a different document, would be of great value to a professional. In addition, an improved work product management system would allow professionals to efficiently and effectively manage their work product.

SUMMARY

The inventors have recognized the necessity for additional improvements in managing work product. In particular, the present invention allows an electronic document associated with a legal mutter to be received. Next, the content type for the electronic document is resolved. For example, the content type for the electronic document may be a contract. Next, a product, to which a user has a subscription, enhances the electronic document. The enhanced electronic document may then be stored and utilized later in a user-initiated search. When the user decides to search for the enhanced electronic document, the enhanced electronic document is only retrieved for the user if he/she has the appropriate permissions to access and/or view the enhanced electronic document.

Advantageously, the present invention permits populating, automatically, information into a field-oriented electronic document where the information is extracted from a different electronic document. For example, a user uploads a document while working on breach of contract legal case. A resolution module 1135*b* may analyze the structure and content of the document to determine the electronic file content type is a contract. Subsequently, an extraction module 1135*e* may extract metadata (e.g., entity names) from within the party fields. If the electronic document was an image, for example, a program may have to convert the image into text before the extraction module 1135*e* can commence. The extracted entity names are then associated with the appropriate field and breach of contract legal case and stored. Next, a user wants to draft a field-oriented electronic file (e.g., a complaint) in the same breach of contract legal case. The stored party fields from the contract are gathered from a repository and used to populate the complaint with the appropriate information regarding the party fields.

Advantageously, the present invention allows for saving, organizing, enhancing, searching, and sharing information, documents, and communications relevant to a user's work product within the user's company and with external people based on access permissions. Furthermore, it permits integration and interaction with the tools/products such as email, Microsoft® Office, and online legal research (such as Westlaw® or LexisNexis®), and could be accessed remotely from home, smart phone, tablet and the like.

Additional advantages and/or features of the present invention wilt be set forth in part in the description. It is to be understood that both the foregoing general description and the following detailed description of the present invention are exemplary and explanatory and are intended to provide further explanation of the present invention as claimed.

BRIEF DESCRIPTION OF THE DRAWINGS

FIGS. 4-37 are exemplary interfaces 400-3700 which correspond to one or more embodiments of the invention.

DETAILED DESCRIPTION OF THE EXEMPLARY EMBODIMENT(S)

Figure 1:
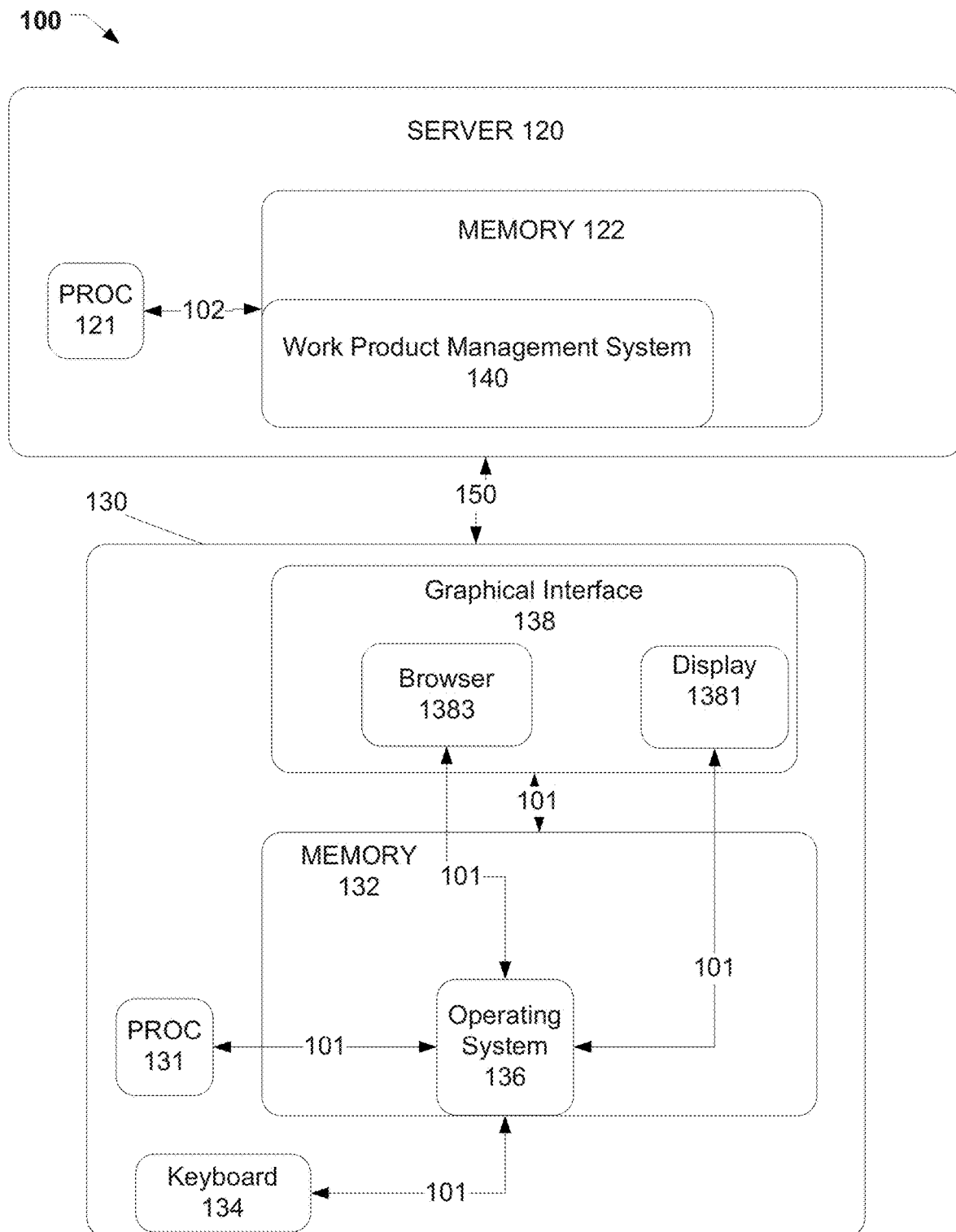
FIG. 1 is an exemplary system 100 which corresponds to one or more embodiments of the invention.

The description includes many terms with meanings derived from their usage in the art or from their use within the context of the description. However, as a further aid, the following examples are presented. The term "electronic file" is any electronic content that is intended to be used in either an electronic form or as printed output. Formats for electronic files include markup languages and corresponding markup language files. Markup language files are files written in a markup language. Exemplary markup languages include HyperText Markup Language (HTML), Extensible Markup Language (XML), Extensible HyperText Markup Language (XHTML) and the like. Examples of electronic files include word processing documents, spreadsheets, audio files, video files, image files, text documents, text associated with an image and field-oriented files. A field-oriented electronic file has a structure that contains at least one field within the electronic file. The term "work product" includes any materials that have been created, drafted, manipulated, edited, organized and/or uploaded by a user. In addition, work product extends beyond the legal profession. Work product may be produced by tax, accounting, financial, healthcare, scientific, and legal professionals. Exemplary work product includes litigation matters, transactional legal matters, emails, documents, folders, SEC filings, stock price listings, scientific white papers and the like. The term "electronic file content type" is a determination of the content associated with the electronic file. Exemplary electronic file content types include a contract, a legal motion document, a legal brief, a settlement agreement, an email, a memorandum and/or any content type that may be associated with work product. An "enhanced electronic file" is an electronic file wherein at least one subscription program has been executed. A subscription program includes a program where the user has a subscription and/or a feature/function within a program where the user has a subscription. A program could be a product, a set of features, a function of the product and/or anything that executes a set of tasks to produce an output. For example, a word processing program may have a spell check function. This function enhances the word processing document by correcting improper spelling. Therefore, the enhanced word processing document (i.e., an enhanced electronic file) is a document where the spell check function (i.e., a subscription program) has been executed. The term "data" is information in a form suitable for use with an access device. The term "database" is a collection of data for one or more purposes, in digital form. A database may refer to a logical database and/or a physical database. The term "matter security level" is a customized permissions and grouping for each given matter. For example, a corporate legal department may have several divisions. The matters for the employment division may have different matter security levels than the intellectual property division, in addition, within a division, a matter security may also be different. For instance, a paralegal may have administrative access while an attorney has read only access.

Exemplary System

Figure 2:
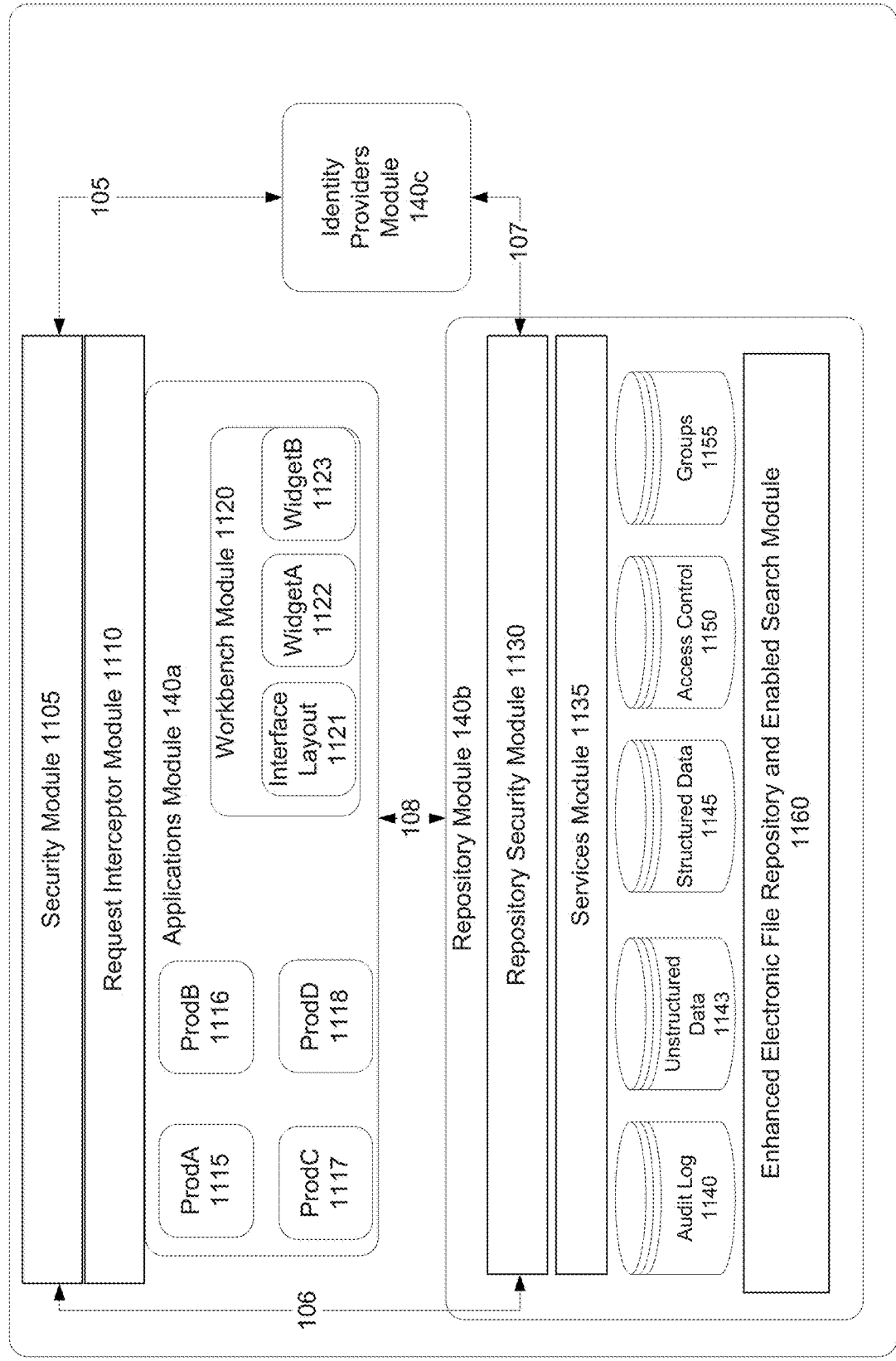
FIG. 2 is an exemplary work product management system 140 which corresponds to one or more embodiments of the invention.
Figure 2A:
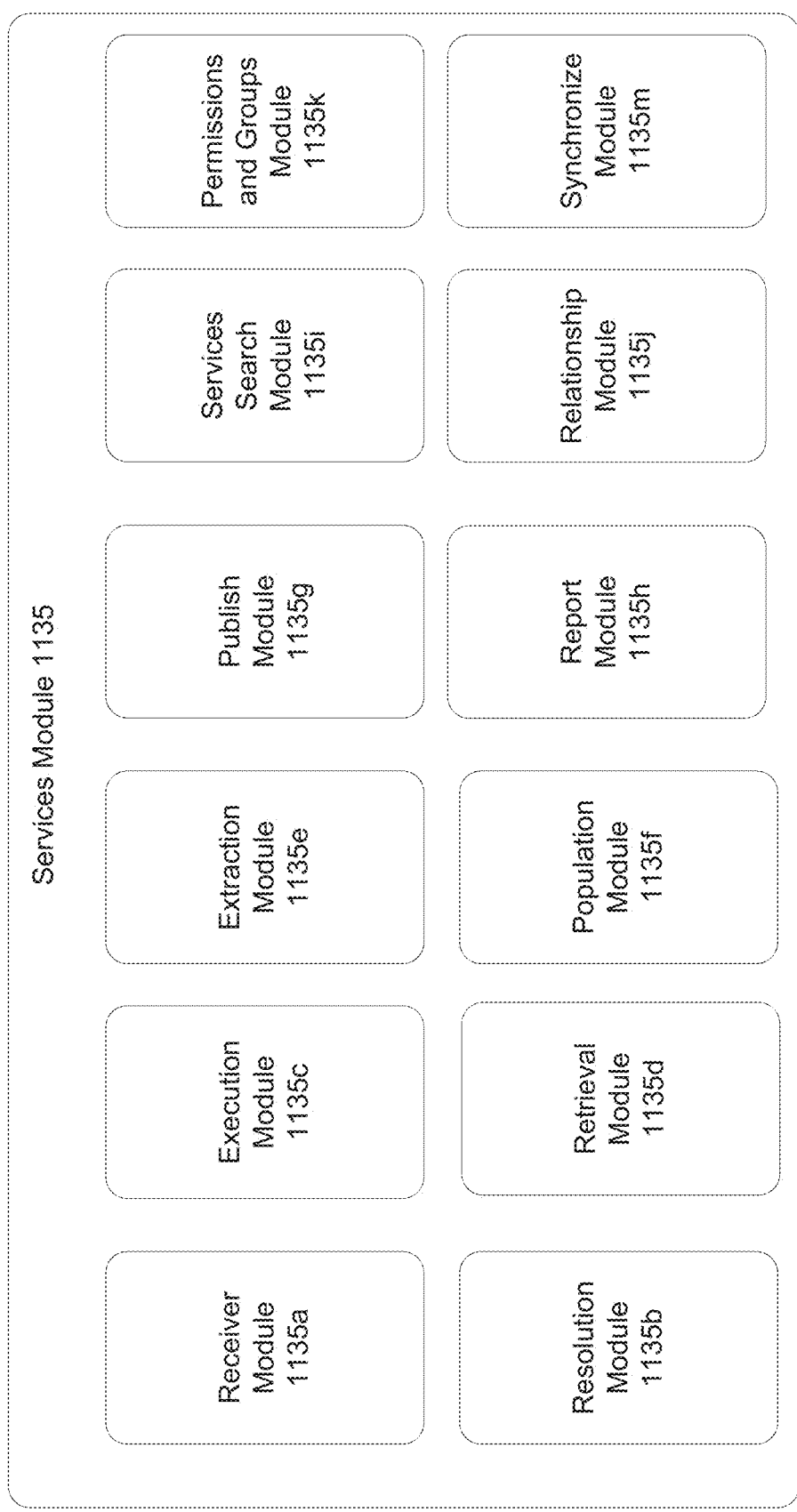
FIG. 2A is an exemplary services module 1135 which corresponds to one or more embodiments of the invention.

FIGS. 1, 2, and 2A show an exemplary hosted system 100, an exemplary work product management system 140, and an exemplary services module 1135, respectively, which may be adapted to incorporate the capabilities, functions, methods, and interfaces of the present invention. System 100 includes a server 120 and an access device 130.

Server 120 is generally representative of one or more servers for serving data in the form of webpage or other markup language with associated applets, ActiveX controls, and/or other related software and data structures. In addition, server 120 transmits a signal via a wireless or wireline transmission channel 150 to at least one access device, such as access device 130. For example, a wireless or wireline transmission channel 150 may be associated with a request to invoke a unique resource locator CURL) on access device 130. Server 120 includes a processor 121 and a memory 122, wherein the memory 122 further includes a work product management system 140. Processor 121 and memory 122 are connected via computer bus 102, which is shown in server 120. Computer buses 101 and/or 102 are buses that transmit information between the access device's components/elements and/or between multiple access devices. For example, computer bus 101 and computer bus 102 aid in transmitting information (e.g., a signal) between access device 130 and server 120. Processor 121 may use computer bus 102 to queue a request that is to be transmitted through a signal, from server 120, via a wireless or wireline transmission channel 150 and is then ultimately received by processor 131 through the utilization of computer bus 101. Generally, server 120 transmits the signal via a wireless or wireline transmission channel 150 to at least one access device, such as access device 130.

Processor 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores a work product management system 140.

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is anon-mobile access device which includes a graphical interface 138, a processor module 131, a memory 132, and a keyboard 134. AU of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media well known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor 131 reads data, instructions, messages or message packets, and other computer readable information from the computer readable medium.

In one exemplary embodiment, memory 132 stores code (machine-readable or executable instructions) for an operating system 136. Operating system 136 is coupled to graphical interface 138 and various other components, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134, the processor 131. For example, the keyboard 134 sends inputs, via computer bus 101, to the operating system 136. The operating system 136 then determines the work product management system 140 needs to be utilized, engages the work product management system 140 through a signal via a wireless or wireline transmission channel 150, accepts the work product management system output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When the work product management system 140 is initiated, a display 1381 is defined in memory 132 and rendered on graphical interface 138. Upon rendering, the graphical interface 138 presents the data/results in association with the modules from the work product management system 140 as further discussed herein.

FIG. 2 illustrates an exemplary embodiment of a work product management system 140. In some embodiments, the access device 130 may access the work product management system 140 from server 120 through a signal via a wireless or wireline transmission channel 150. The work product management system 140 is configured to execute from memory 122. The work product management system 140 includes a security module 1105, a request interceptor module 1110, an applications module 140a, a repository module 140b, and an identity providers module 140c. Each are described herein. Within the work product management system 140, is a set of wireless or wireline internal transmission channels 105, 106, 107, and 108 wherein each internal transmission channel connects two modules. For example, internal transmission channel 105 connects a security module 1105 and a identity providers module 140c. In another example, internal transmission channel 107 connects the identity providers module 140c and a repository security module 1130. In yet another example, internal transmission channel 106 connects the security module 1105 and the repository security module 1130. In yet another example, internal transmission channel 108 connects an applications module 140a and a repository module 140b. Before a user can access and utilize the applications module 140a and repository module 140b of the work product management system 140, the security module 1105 is configured to authenticate a user's credentials. For instance, user credentials may be a user name and associated password. The security module 1105 is further configured to transmit these credentials over a wireless or wireline internal transmission channel 105 to the identity providers module 140c. The identity providers module 140c is configured to receive and authenticate the credentials. Once the credentials have been authenticated, the identity providers module 140c is further configured to transmit a token and an indication of successful authentication back over the wireless or wireline internal transmission channel 105 to the security module 1105. An exemplary token may be a hash value that is configured by the identity providers module 140c. The primary focus of the token is to provide an additional check in addition to the user credentials authentication. After successful authentication via security module 1105, the security module 1105 is further configured to transmit the received token over a wireless or wireline internal transmission channel 106 to repository security module 1130. As a double check to make sure the user may access the applications module 140a and repository module 140b, the repository security module 1130 is configured to transmit the token over an internal transmission channel 107 to the identity providers module 140c to re-authenticate the token. The re-authentication may happen each time the user tries to access the applications module 140a or as frequently as needed to provide a secure login process. The identity providers module 140c is configured to receive the token, verify the authenticity and transmit a confirmation of token authenticity over the wireless or wireline internal transmission channel 107 back to repository security module 1130. A significant reason for enabling double authentication is due to the workbench 1120 in the applications module 140a. Another important reason for the token is to enable multiple products to interact with the repository module 140b. Essentially the repository module 140b trusts the identity providers module 140c. Thus any product that correctly registers with the identity providers module 140c and receives a token may access the repository module 140b. The workbench 1120 may include several widgets. Each widget, as a standalone product, may require separate authentication. However, when the widgets are grouped within the workbench 1120, an exemplary embodiment includes only having to authenticate (i.e., login) once to access all the widgets within the workbench 1120. The work product management system 140 wants to double check that the user is allowed access to workbench 1120 and the widgets within workbench 1120.

The request interceptor module 1110 is configured to route received requests and enable a security protection on any content that is received due to the request. An exemplary request interceptor module is described in U.S. patent application Ser. No. 12/982,446 entitled "Monetized Online Content Systems And Methods And Computer-Readable Media For Processing Requests For The Same." This application is herein incorporated by reference.

The applications module 140a is configured to contain one or more of a product and/or a workbench. The applications module 140a is a logical grouping of applications in which the user may ultimately interact. In FIG. 2, an exemplary applications module 140a includes product A (ProdA) 1115, product B (ProdB) 1116, product C (ProdC) 1117, product D (ProdD) 1118, and workbench 1120. Each of the products may be standalone, independent products that have the ability to interact with the work product management system 140 via an application programming interface (API) or other data access layer (not shown). For example, ProdA 1115 may be an online research product such as WestlawNext®, ProdB 1116 may be a billing product such as Serengeti®, ProdC 1117 may be a calendaring product such as Westlaw® Legal Calendaring, and ProdD 1118 may be a tax product such as OneSource®. Again referring to FIG. 2, the workbench 1120 may include a combination of products that a user would want to interact with on one interface. The workbench 1120 includes an interface layout module 1121, a WidgetA 1122 and a WidgetB 1123. The interface layout module 1121 is configured to adapt the information provided and ultimately displayed to the user depending on the access device. For example, if a user is accessing the workbench 1120 through a desktop computer, the dimensions of a user's browser window are significantly larger than a mobile device browser window. Therefore, the interface layout module 1121 is configured to recognize the limitations of the access device and adapt the information provided to the user. Exemplary interfaces are described herein. Widgets may be products that have a standalone version of the product or they could be products/features that were built especially for the workbench 1120. For instance, WidgetA 1122 could be an online research product such as WestlawNext® and WidgetB 1123 could be a product regarding legal holds. The online research product may have a standalone product version but in this instance it is integrated into the workbench 1120. The legal hold product however, is built to reside within the workbench 1120 and does not have a standalone product version. In addition, a widget may also be a product or feature that includes third party vendors. For example, WidgetA 1122 may be a contact management product. This contact management product may consequently receive and update information from the user's contacts on Microsoft® Outlook. Furthermore, a contact may be added to the contact management within workbench 1120. Consequently the contact is updated in Microsoft® Outlook via the functionality of the contact management product. This functionality may be utilized with any third party vendor that allows information to be pulled, pushed back and updated. The workbench 1120 may also include widgets of various content types. The products and/or widgets that interact with the work product management system 140 may be legal, financial, news, tax, accounting, healthcare, scientific, compliance, intellectual property and the like. In addition, a product and/or widget may be a combination of the aforementioned listing. Exemplary interfaces of an exemplary workbench are described herein. The applications module 140a is operatively connected to repository module 140b. In particular, the applications module 140a, including workbench module 1120, transmits and/or receives requests and/or information over an internal transmission channel 108 to/from repository module 140b.

Repository module 140b includes repository security module 1130, services module 1135, an audit log database 1140, an unstructured data database 1143, a structured data database 1145, an access control database 1150, a groups database 1155 and an enhanced electronic file repository and enabled search module 1160. Each are described herein. The services module 1135 is configured to execute the necessary actions to accomplish a task or a set of tasks. The services module 1135 may include system services and user-initiated services. System services are services that the work product management system 140 is configured to initiate. For example, a system service may be a service that periodically gathers data from the audit log database 1140 regarding the number of times uploaded documents are viewed, delivered, and/or referenced. The data is then aggregated and stored back into the system so that it can be used to produce better search results during a user initiated search. In other words, if data aggregation aids in producing more meaningful information, the work product management system 140 would schedule the initiation of a system service that would collate and/or aggregate data to create enhanced, value-add data. User-initiated services are services that execute because of user interaction with the work product management system 140. For example, if a user wants to upload a document into the work product management system 140, a user-initiated service would execute to ultimately upload the document.

In some embodiments, a module is configured to execute the system services and user-initiated services. For example, a user may want to upload a document to the work product management system 140. Once the document is uploaded, an electronic file content type (e.g., a contract, email, or memorandum) may be resolved along with executing at least one subscription program against the initial electronic file. Finally, after completion of the subscription program, an enhanced electronic file is stored. This enhanced electronic file may be retrieved and ultimately provided to the user if he/she has the necessary matter security level to access the file. In FIG. 2A, the aforementioned example is illustrated by having a services module 1135 that includes a receiver module 1135a, a resolution module 1135b, an execution module 1135c and a retrieval module 1135d. In addition, the services module 1135 may also include but are not limited to a publish module 1135g, a report module 1135h, a services search module 1135i, a relationship module 1135j, a permissions and groups module 1135k, and a synchronize module 1135m. The modules within the services module 1135 are connected via, a computer bus (not shown). Each module is described herein. Furthermore, the method for executing services module 1135 and each of the modules within the services module 1135 are described in the exemplary method section. The receiver module 1135a is configured to receive an initial electronic file where the initial electronic file is associated with a work product. For example, a user may upload a document (i.e., work product) which in turn is received by the receiver module 1135a. The resolution module 1135b is configured to automatically resolve an electronic file content type associated with the initial electronic file. Continuing from the previous example, a resolution is made that the document is a contract (i.e., an electronic file content type) where the resolution occurs within the resolution module 1135b. The execution module 1135c is configured to automatically execute, responsive to a resolution of the electronic file content type, at least one subscription program associated with the electronic file content type of the initial electronic file. Referring to the continuing example, a contract clause advisor program (i.e., a subscription program) is executed against the now determined contract document where the execution occurs within the execution module 1135c. The retrieval module 1135d is configured to retrieve an enhanced electronic file based on a matter security level where the enhanced electronic file is associated with an indication of completion of the at least one subscription program. Continuing from the example, the contract is considered an enhanced contract once the contract clause advisor program has completed (i.e., an indication of completion). Moreover, the enhanced contract is retrieved by the retrieval module 1135d based on user permissions for that enhanced contract (i.e., a matter security level). Furthermore, the services module 1135 may also include an extraction module 1135e configured to extract a set of metadata from the initial electronic file and a population module 1135f configured to automatically populate at least one field within a field-oriented electronic file from the set of metadata. Again referring to the abovementioned example, the extraction module 1135e is configured to extract metadata from the initial contract and the population module 1135f is configured to automatically populate, for example, contracting party name metadata, within a field-oriented assignment document (e.g., the assignment document has a field wherein population of a contracting party name is indicated).

A publish module 1135g may be configured to provide a publishing service that receives an electronic file and consequently executes a set of tasks to create a version of the electronic file that is compatible with the work product management system. For example, an electronic file is in an image pdf format. This format is not conducive to searching. The publish module 1135g may be configured to execute optical character recognition (OCR) software that allows the electronic file to now be searchable. The publish module 1135g may be further configured to extract geo-location information from digital images, transcribe audio files to text, or perform facial recognition on digital images to associate with work product. A report module 1135h may be configured to execute a report mechanism that gathers data and transmits that data to the user in the format he/she requested. For example, a user may want to know what matters have been deleted within the past three days. The report module 1135h is configured to execute this query against the audit log database 1140, retrieve the data and transmit that data to the applications module 140a via internal transmission channel 108. A services search module 1135i may be configured to search various sources (e.g., databases and repositories) to retrieve the data the user requested. For example, the user may be searching for a specific document. In another example, the user may be searching for a string of text that resides within an unknown document. In yet another example, the user may be searching for a listing of contacts that reside within a specific company. In several examples, the services search module 1135i is configured to execute a search across various sources to determine which electronic files contain the necessary result. A synchronize module 1135m may be configured to synchronize data between access devices. Synchronizing occurs when there is online access (i.e., internet access) between access device 130 and server 120. Wireless or wireline transmission channel 150 is configured to send signals between access device 130 and server 120. An exemplary signal could be information regarding the synchronizing of data between access device 130 and work product management system 140, particularly services module 1135. A relationship module 1135j may be configured to recognize relationships within an electronic file, the work product, a set of electronic files and any combination thereof. For example, if a legal brief where uploaded into the work product management system 140, the relationship module 1135j is configured to recognize, extract and resolve the relationships within the legal brief. Exemplary relationships within a legal brief might include but are not limited to an entity name as the plaintiff, an entity name as the defendant, a state as the jurisdiction, and an entity name as the judge. In addition, the relationship module 1135j is further configured to recognize the relationship between the legal brief and the work product legal matter). In yet another example, an uploaded electronic file may correlate to other related material (e.g., additional uploaded electronic files within a user's firm and/or other online research documents). Relationship recognition, extraction and resolution are known to those skilled in the art. A permissions and groups module 1135k may be configured to implement a set of instructed permissions and groupings that the user, administrator and/or system have implemented for an electronic file. For example, a user may want to share a folder with the corporate legal department group. The user selects his permissions and group criteria and the permissions and groups module 1135k is configured to receive that criteria and place the requested matter security level (i.e., his permissions and grouping) on that folder. The permissions and group module 1135k is further configured to store the permissions in the access control database 1150 and the group in the groups database 1155.

In addition to each module within the services module 1135 configured to execute a service necessary to the work product management system 140, particularly repository module 140b, the modules within the services modules 1135 may also be configured to transmit a request for data from the audit log database 1140, the unstructured data database 1143, the structured data database 1145, the access control database 1150 and enhanced electronic file repository and enabled search module 1160. Consequently, the services module 1135 is further configured to receive the requested data, provide additional services if need be, and transmit the data to applications module 140a via internal transmission channel 108. This data may be ultimately displayed to the user via the browser 1383.

The audit log database 1140 contains a log of audit information and/or activity that might be useful for audit and/or reporting purposes. Audit information may include but is not limited to a deletion activity, the information associated with the deletion activity, a creation activity, the information associated with the creation activity, and/or any other activity/information that may be useful for audit and/or reporting purposes.

The unstructured data database 1143 contains non-fielded data. For example, a string of text such as an electronic annotation or note is non-fielded data. Additionally, a document containing text and an image may be considered non-fielded data. A non-fielded electronic file that the user has uploaded into work product management system 140 is stored as an encrypted and compressed file in the unstructured data database 1143. Put another way, an exemplary non-fielded electronic file may be an unprocessed electronic file that has been uploaded to the work product management system 140 but a subscription program has not yet been executed.

The structured data database 1145 contains fielded data. Exemplary fielded data includes but is not limited to folders, foldered items, contacts, matters, tasks, calendar items and the like. In addition, the structured data database may also contain relationships associated with the structured data. For example, if the entity name "John Doe" is determined to be the plaintiff in a legal matter using the extraction module 1135e and relationship module 1135j explained above, the relationship information that "John Doe" is the plaintiff is stored within the structured data database 1145. In some embodiments, an electronic file may be stored within the unstructured data database 1143 as just text, for example, and may also be stored within the structured data database 1145 because the electronic file also contains field data.

The access control database 1150 contains permissions and/or permissions sharing data. For example, if a user created a legal matter within the work product management system 140, the user is considered an administrator for that legal matter and has the associated administrative permissions. These administrative permissions are stored within access control database 1150. In another example, if a user interacting with the work product management system 140 decides to allow a document to be viewed/edited by another individual or group (i.e., sharing the permission), those permissions for sharing are stored within the access control database 1150.

The groups database 1155 contains data about the groups, internal users, and external users. There may be several different types of users within the work product management system 140. In addition, some users may be one user type in one work product management system and another user type in a different work product management system. For example, in some embodiments, the internal users may be individuals that work within a corporate legal department. These internal users are considered internal because the corporation is the entity initiated a specific work product management system 140. Also utilizing the exemplary work product management system 140 are external users. Continuing from the previous example, an external user may be an outside attorney providing legal services to the corporate legal department. In another example, the outside attorney who is providing legal services to a corporate legal department may be considered an external user within the corporation's work product management system; however, the outside attorney may have his own work product management system in which he is an internal user. In addition, data about groups is stored within groups database 1155. This may be any combination of internal and/or external users. For example, a group may be the intellectual property legal department within the larger corporate legal department. The groups may be a few people, a whole department and/or firm, a sub-set of a department and/or firm, and/or a company.

The enhanced electronic file repository and enabled search module 1160 is configured to load and/or store enhanced electronic files and enable search capability on the enhanced electronic files. An exemplary enhanced electronic file repository and search module is described in the following patents and applications: U.S. Pat. No. 7,085,755 entitled "Electronic Document Repository Management and Access System;" U.S. Pat. No. 7,941,431 entitled "Electronic Document Repository Management and Access System" U.S. Pat. No. 7,480,644 entitled "Systems, Methods, And Software For Distributed Loading Of Databases;" U.S. patent application Ser. No. 12/354,642 entitled "Systems, Methods And Software For Distributed Loading Of Databases;" U.S. patent application Ser. No. 12/819,847 entitled "Systems, Methods, And Software For Distributed Loading Of Databases;" and U.S. patent application Ser. No. 10/832,094 entitled "Distributed Search Methods, Architectures, Systems, And Software." These patents and applications are herein incorporated by reference.

In the exemplary embodiment, the audit log database 1140, the unstructured data database 1143, the structured data database 1145, the access control database 1150, and the groups database 1155 are illustrated as separate databases. In other embodiments, one skilled in the art appreciates that these databases may be physically and/or logically combined in any combination to implement the present invention.

In some embodiments, management software (not shown is installed on access device 130. The installed management software is configured to communicate with the work product management system 140 via transmission channel 150. Installing management software on a desktop access device, for instance, allows the work product management system 140 to integrate with operating system 136 and/or third party software used frequently by the users. In other words, the management software may be configured to execute services within the access device 130 and/or store data within memory 132. For example, a user may be working on a document within a word processing application that resides on a desktop access device. Upon saving the document, the user may upload it to the work product management system 140 without having to leave the word processing application. In addition, the document may be saved and stored in memory 132.

Furthermore, the management software is stored in memory 132 (e.g. RAM) and/or hard drive (not shown). Memory 132 stores code (machine-readable or executable instructions) for an operating system 136 and management software. Operating system 136 interacts, via computer bus 101, with the keyboard 134, the processor 131, and the management software. For example, the keyboard 134 sends inputs, via computer bus 101, to the operating system 136. The operating system 136 determines that the management software is active, accepts the management software input as data and stores that data temporarily in memory 132 (e.g. RAM). Each instruction from management software is sent by the operating system 136, via computer bus 101, to the processor 131. These instructions are intertwined with instructions from other programs that the operating system 136 is overseeing before being sent to the processor 131. Operating system 136 and browser 1383 not only receive inputs from keyboard 134, but also support rendering of graphical consumer interfaces within graphical interface 138.

Exemplary Method as Conducted by System 100

Figure 3:
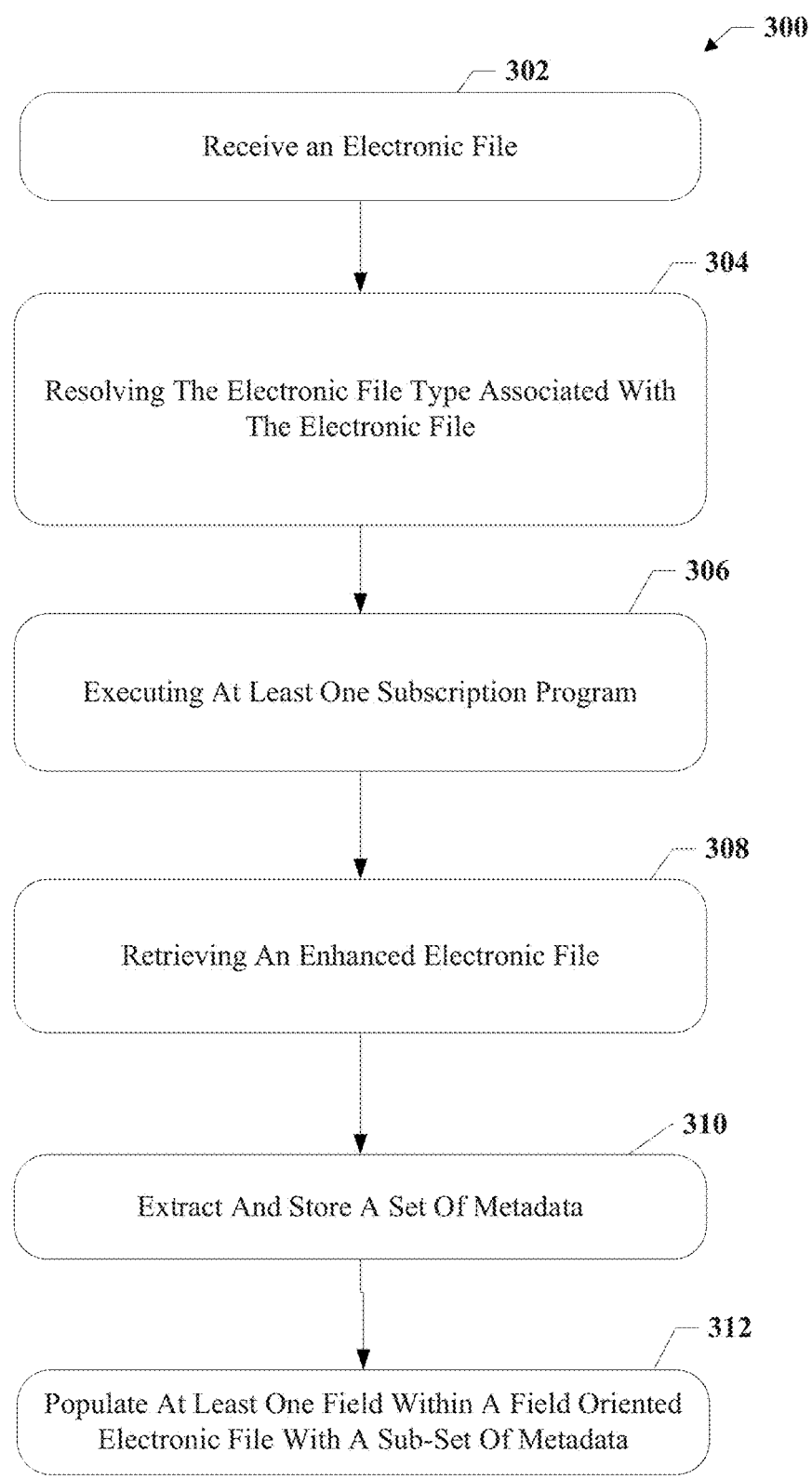
FIG. 3 is an exemplary method 300 which corresponds to one or more embodiments of the invention.

Referring now to FIG. 3, system 100 is configured to implement method 300. Method 300 includes functional blocks 302-312. These functional blocks are steps that perform actions including assignments, decisions, assessments and other like functions.

In step 302, the work product management system 140 receives an initial electronic file. Instances which may invoke receiving an initial electronic file include but are not limited to a user uploading an electronic file and the work product management system 140 scheduling a task, via services module 1135, to upload electronic files from access device 130 and/or third party provider. For example, the work product management system 140 may automatically upload contacts from LinkedIn®. Either way, the services module 1135 of the work product management system 140 is configured to receive the initial electronic file. Once the electronic file has been received, the process continues to step 304.

In step 304, an electronic file content type is resolved by the resolution module 1135b within the services module 1135. The electronic file content type is associated with the initial electronic file. For example, a user uploads a document to the work product management system 140. The resolution module 1135b reads the filename extension on the electronic file to determine that the document's electronic file type is word processing file. A filename extension is a suffix to the name of a computer file applied to indicate the file format of its contents or usage. Exemplary filename extensions include .txt (text file), .doc (word processing file), .xls (spreadsheet file), .pdf (portable document format), .jpeg (image file), and .m4a (audio/video file). In addition, the resolution module 1135b further resolves an electronic file content type by processing the file contents. For instance, the resolution module 1135b may analyze the structure and content of the electronic file to determine the electronic file content type is a contract. Other exemplary electronic file content types may include but are not limited to briefs, contracts, legal motions, settlement agreements, entails, memorandums, SEC filings, stock price listings, scientific white papers and the like. After the electronic file content type has been resolved, the method proceeds to step 306.

In step 306, at least one subscription program is executed, automatically, within an execution module of the services module 1135. The at least one subscription program is associated with the electronic file content type of the initial electronic file. At this point, various modules within the services module 1135 may be executed against the initial electronic file. Exemplary subscription programs may include visible user programs, non-visible user programs or features/functions within a subscription program. For example, a visible user program may be a legal citation program that gets executed against a legal brief to assist an attorney with determining the proper legal citation formats. For instance, if a user has entered the following legal citation "109 S. Ct, 2166," the legal citation program advises the attorney as to whether the legal citation is valid according to legal citation rules. An exemplary legal citation advisor program is described in U.S. patent application Ser. No. 11/849,918 entitled "Systems, Methods, Software, And Interfaces For Formatting Legal Citations" and is incorporated herein by reference. An exemplary non-visible user program may be a hyperlinking program that gets executed against a legal brief to create hyperlinks for legal citations within the legal brief. For instance, the hyperlinking program would run over the legal brief to 1) determine the legal citations and 2) resolve to legal citations to a document within an exemplary online research system. Going back to the previous example, the hyperlinking program recognizes "109 S. Ct. 2166" as a legal citation and then goes to the online research system to see if the legal case associated with the legal citation exists. If a document does exist, the text of the legal citation becomes hyperlinked. Once the hyperlink is selected, the user is taken to the legal case within the online research system. An exemplary hyperlinking program is described in U.S. Pat. No. 7,333,966 entitled "Systems, Methods, And Software For Hyperlinking Names;" U.S. patent application Ser. No. 11/960,054 entitled "Systems, Methods, And Software For Hyperlinking Names" and are incorporated herein by reference. An exemplary feature and/or function within a subscription program may be an entity resolution feature.

The entity resolution feature runs against the initial electronic file to determine if a string of text may be an entity. Then once string of text is determined to be an entity, a resolution attempt occurs to see if the entity may be resolved. For example, the feature comes across the following uppercase letters A-P-P-L-E. The entity resolution feature determines that this string of text along with the fact the letters are uppercased may be an entity. Then the string of text gets resolved against a list of Fortune 500 companies, for example, to determine that the entity is APPLE®. Another exemplary entity resolution feature is from U.S. patent application Ser. No. 12/341,926 entitled "Systems, Methods, And Software For Entity Extraction And Resolution;" U.S. patent application Ser. No. 12/806,116 entitled "Systems, Methods, And Software For Entity Extraction And Resolution" and are incorporated herein by reference. After the at least one subscription program has been executed against the initial electronic file, the initial electronic file is now enhanced due to the benefits the subscription programs provide. This enhanced electronic file may now be stored within repository module 140b, in particular enhanced electronic file repository and enabled search module 1160. The procedure now advances to step 308.

In step 308, the enhanced electronic file is retrieved based on a matter security level. The enhanced electronic file is associated with an indication of completion of the at least one subscription program. In other words, once at least one subscription program has completed and the enhanced electronic file becomes enabled for searching, a user may search for the enhanced electronic file. The user's request for the enhanced electronic file is sent to a search module within the services module 113 wherein the search module retrieves it from the enhanced electronic file repository and enabled search module 1160. In addition, a permissions and group module within the services module 1135 is activated to make sure that the user has the appropriate permissions and is part of a group that is allowed access to the enhanced electronic file.

In some embodiments, method 300 further includes step 310. In step 310, a set of metadata from the initial electronic file is extracted and stored within the structured data database 1145 and/or enhanced electronic file repository and enabled search module 1160. Metadata extraction and storage methods are well known to those skilled in the art. One purpose of metadata extraction and storage is to provide more efficient searching. For example, a services search module 1135i may want to search the extracted and stored metadata instead of searching the text of the electronic file for quicker retrieval. Furthermore, in other embodiments, method 300 further includes step 312. In step 312, at least one field within the field-oriented electronic file is populated, automatically, with the set of metadata. Exemplary fields may include but are not limited to plaintiff, defendant, party name, company name, jurisdiction, entity names, dates, document numbers tax codes and the like. The relationships between the fields and metadata are stored with the structured data database 1145. The services module 1135 implements the population of the appropriate fields with the set of metadata. For example, a user uploads a word processing document white working on work product Z. The work product management system 140 determines that the document is a legal brief, assesses the structure of the brief and consequently extracts metadata (e.g., entity names) from within the plaintiff and defendant fields. The extracted entity names are then associated with the appropriate field and work product Z. These relationships between entity names and the appropriate field and work product Z is stored. Later within the work product management system 140, a user engages WidgetA 1122, a legal form building application, within workbench 1120. The work product management system 140 recognizes that the user wants to draft a motion (i.e., field-oriented electronic file) from the same work product Z. The workbench 1120 transmits a request, via an internal transmission channel 108, to repository module 140b to gather a set of metadata. The services module 1135 then gathers the set of metadata needed from the structured data database 1145 and transmits a signal including the set of metadata and relationships, via internal transmission channel 108, to the workbench 1120. The workbench 1120 then uses the relationships to populate the proper fields within the field-oriented electronic file with the set of metadata.

Exemplary Interfaces

FIGS. 4-37 show exemplary interfaces 400-3700 used in and generated by system 100 and work product management system 140 during operation, which may be adapted to incorporate the capabilities, functions, systems and methods of the present invention. Some figures include more than one interface. These interfaces may occur sequentially in the same window or in separate browser windows (e.g., a pop-up window).

Figure 4:
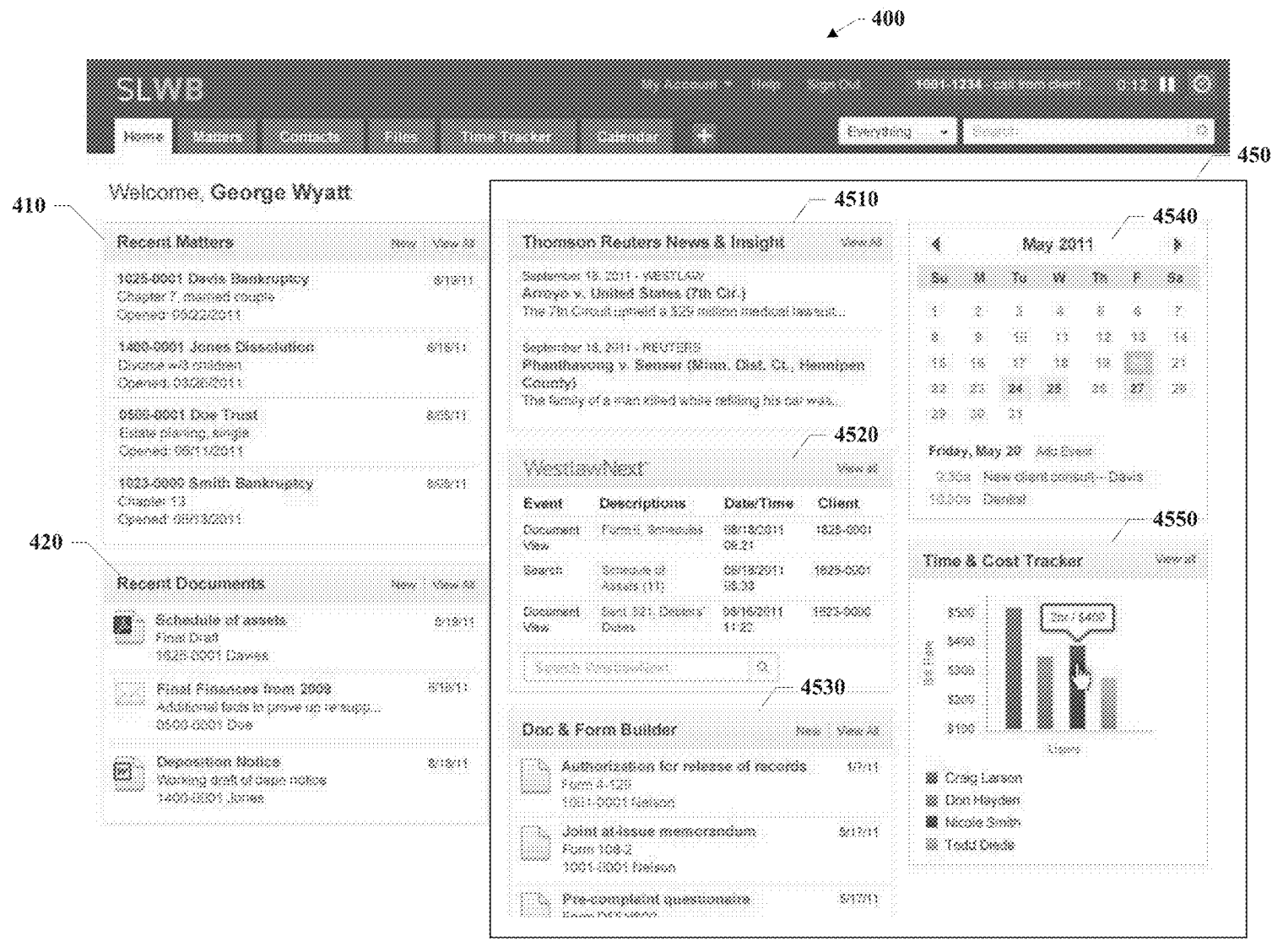
Figure 4A:
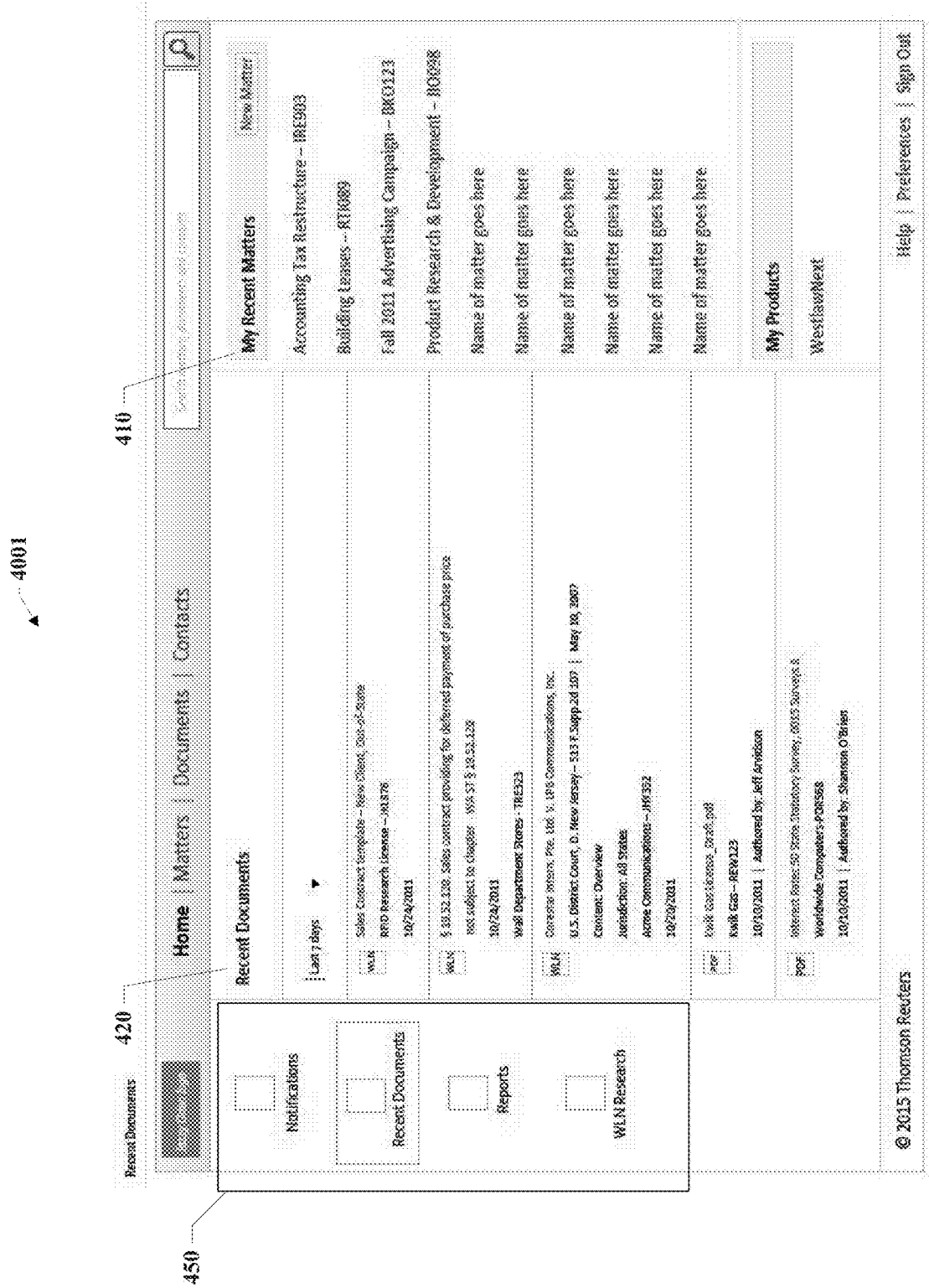

FIG. 4 illustrates an exemplary interface 400 for workbench 1120. FIG. 4 has a set of widgets 450, a listing of recent matters 410 and a listing of recent documents 420. Some widgets are products while others are functions required to run and ultimately display on an interface associated with workbench 1120. In some embodiments, the listing of recent matters 410 and the listing of recent documents 420 may be considered widgets. The set of widgets 450 includes a news widget 4510, an online legal research widget 4520, a document/form builder widget 4530, a calendar widget 4540 and a time/cost tracker widget 4550. FIG. 4A illustrates another exemplary interface 4001 for workbench 1120. FIG. 4A displays a set of widgets 450, a listing of recent matters 410 and a listing of recent documents 420. The set of widgets 450 includes a notification widget 4560, a recent documents widget 4570, a reports widget 4580 and an online legal research widget 4520. The listing of recent documents 420 is being displayed because the user has selected the recent documents widget 4570.

Figure 5:
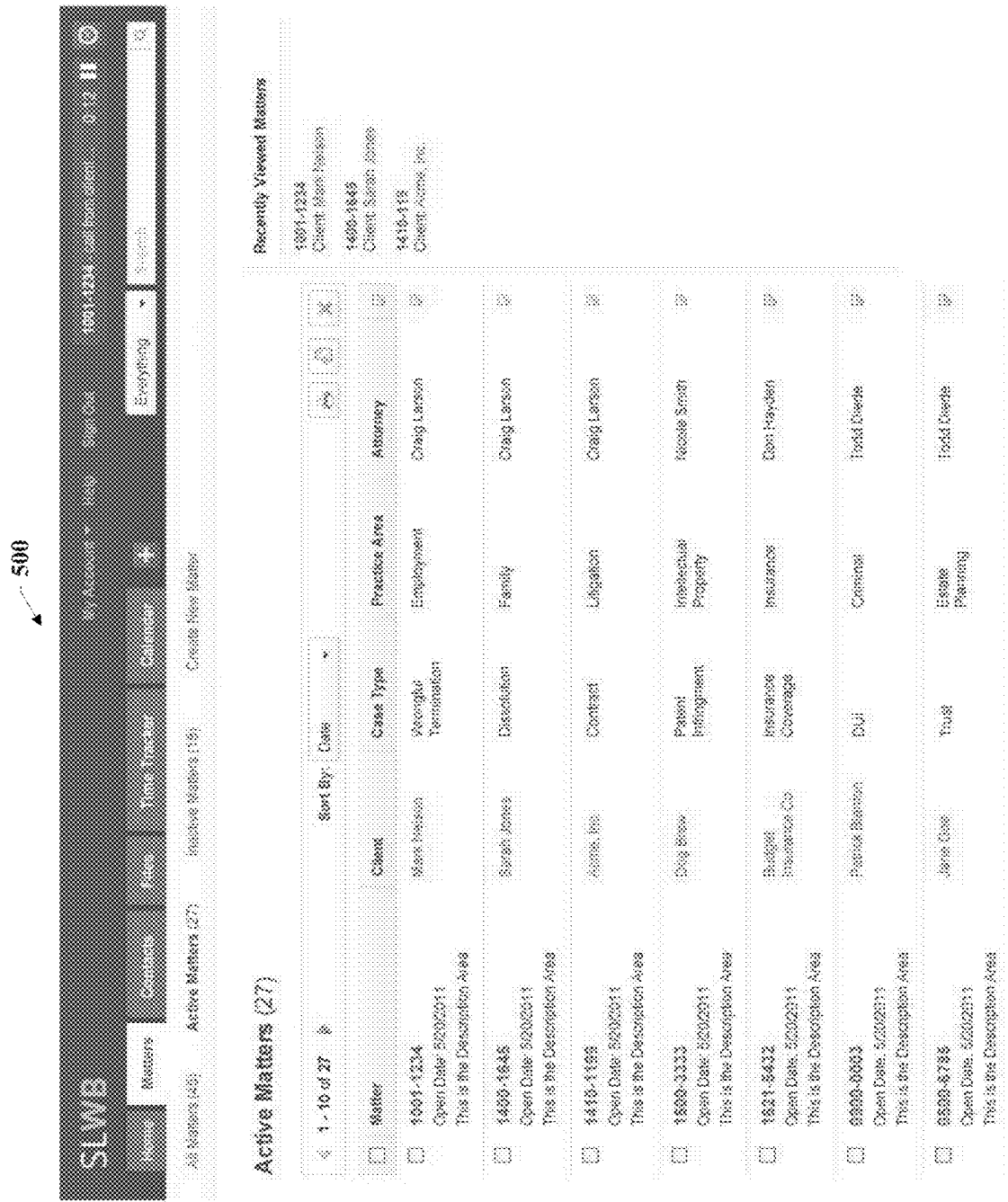

FIG. 5 shows an interface 500 of a listing of active matters within workbench 1120. These matters (i.e., work product) along with the data associated with these matters are stored in repository module 140b and may be accessed using services module 1135 and various databases. The user navigates to this interface by selecting the "Matters" tab towards the top of screen.

Figure 6:
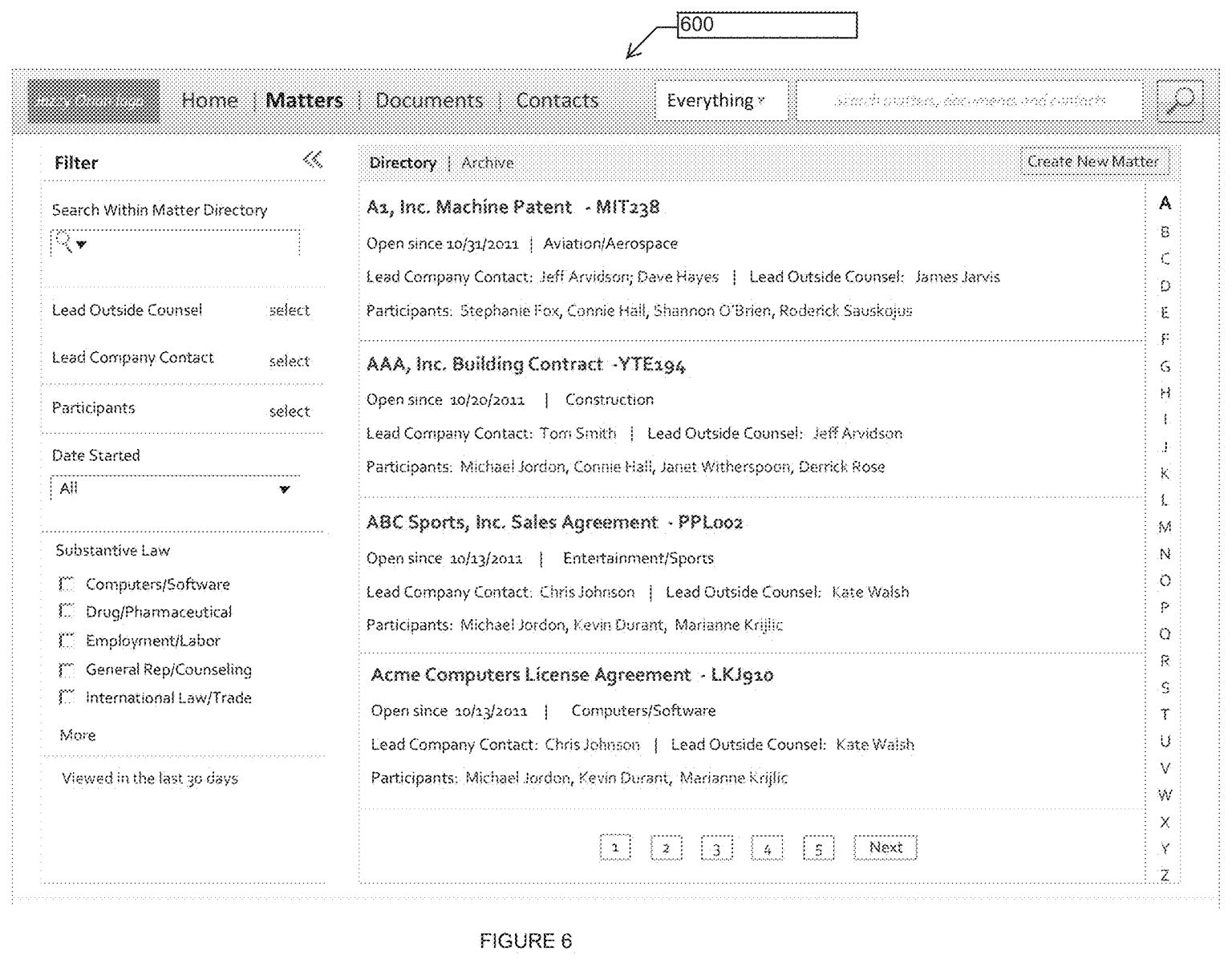

FIG. 6 shows an interface 600 of a listing of matters within workbench 1120. The user navigates to this interface by selecting the "Matters" tab towards the top of screen. In addition, on the left portion of the screen are a set of filters used to search within the matter directory. These filters include but are not limited to matter name, lead outside counsel, lead company contact, participants, date started, matters viewed in last X amount of days and/or substantive law.

FIGS. 7-22 depict various other interfaces regarding matter management within workbench 1120. In particular, FIGS. 7-10 illustrate interfaces representing options relating to a created matter. For example, FIG. 7 shows an interface 700 of an open, active matter. The details of this open matter are displayed including providing access via the icons for documents and matter history. In another example, FIG. 8 shows an interface 800 for editing a matter. A user may choose to select the "Edit Matter" button to edit data within a matter. In some embodiments, any matter detail may be edited. FIGS. 9-10 show interface 900 for closing an existing matter and then interface 1000 for re-opening a previously closed matter. In some embodiments, all matters (i.e., work product) remain in workbench 1120 regardless of the activeness. In other words, if a matter is closed, that matter may remain within the workbench 1120 as an archived matter. This allows a user to always have a record of his/her work product.

Figure 11:
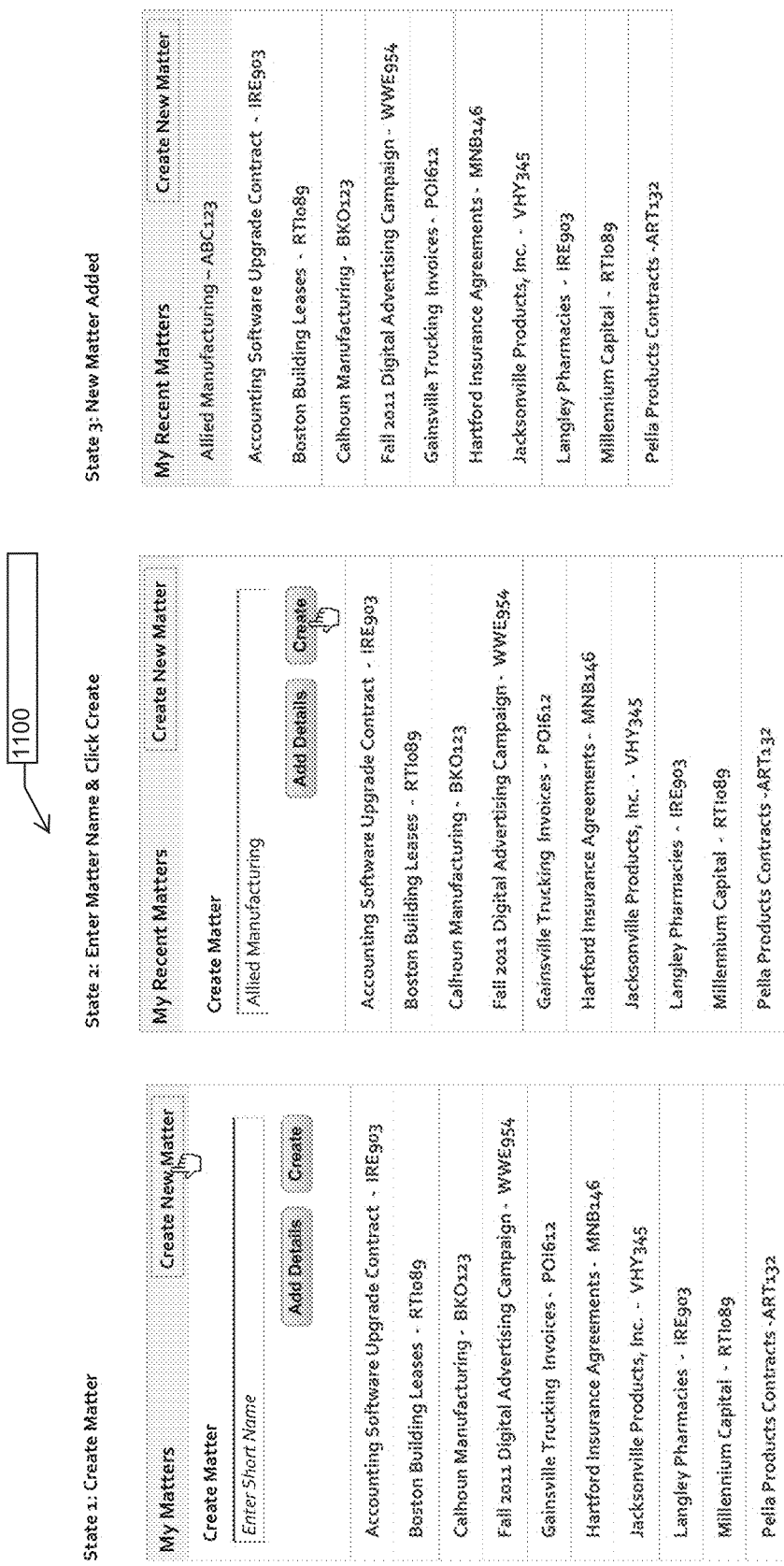

FIGS. 11-14 represent interfaces for creating a new matter within workbench 1120. FIG. 11 shows a set of three interfaces 1100 on how a user may select the "Create New Matter" button, type in the new matter name in the Create Matter text box and select the "Create" button. This process adds the matter name into a list of recent matters. FIG. 12 depicts an interface 1200 representing basic matter details including but not limited to full name, notes, participants, organizational unit, and/or substantive law. FIG. 13 depicts an interface 1300 representing additional matter details including but not limited to company file number, budget, state and/or country. FIG. 14 depicts an interface 1400 representing associated party details including but not limited to adverse law firm and/or associated participants.

Figure 15:
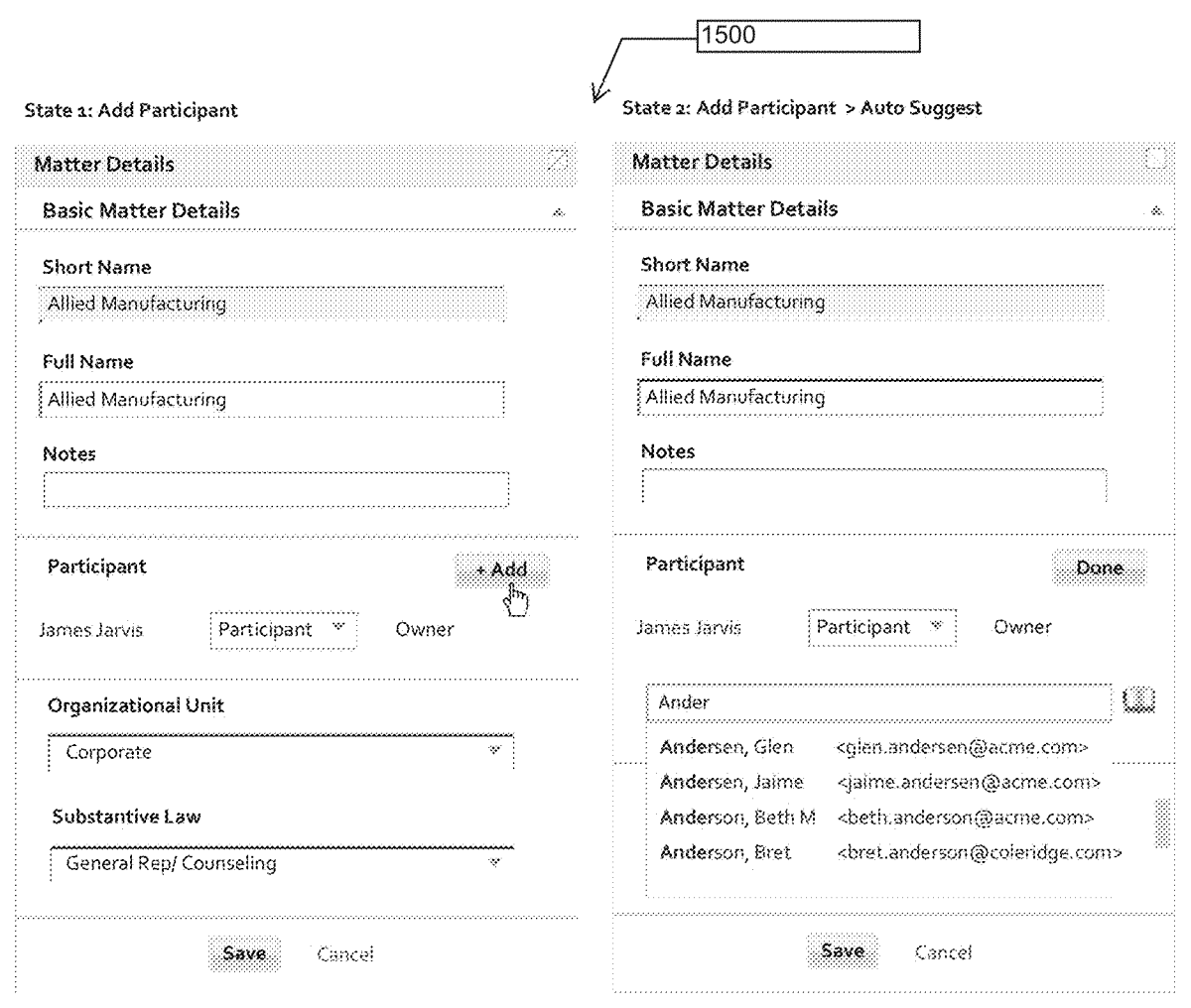
Figure 16:
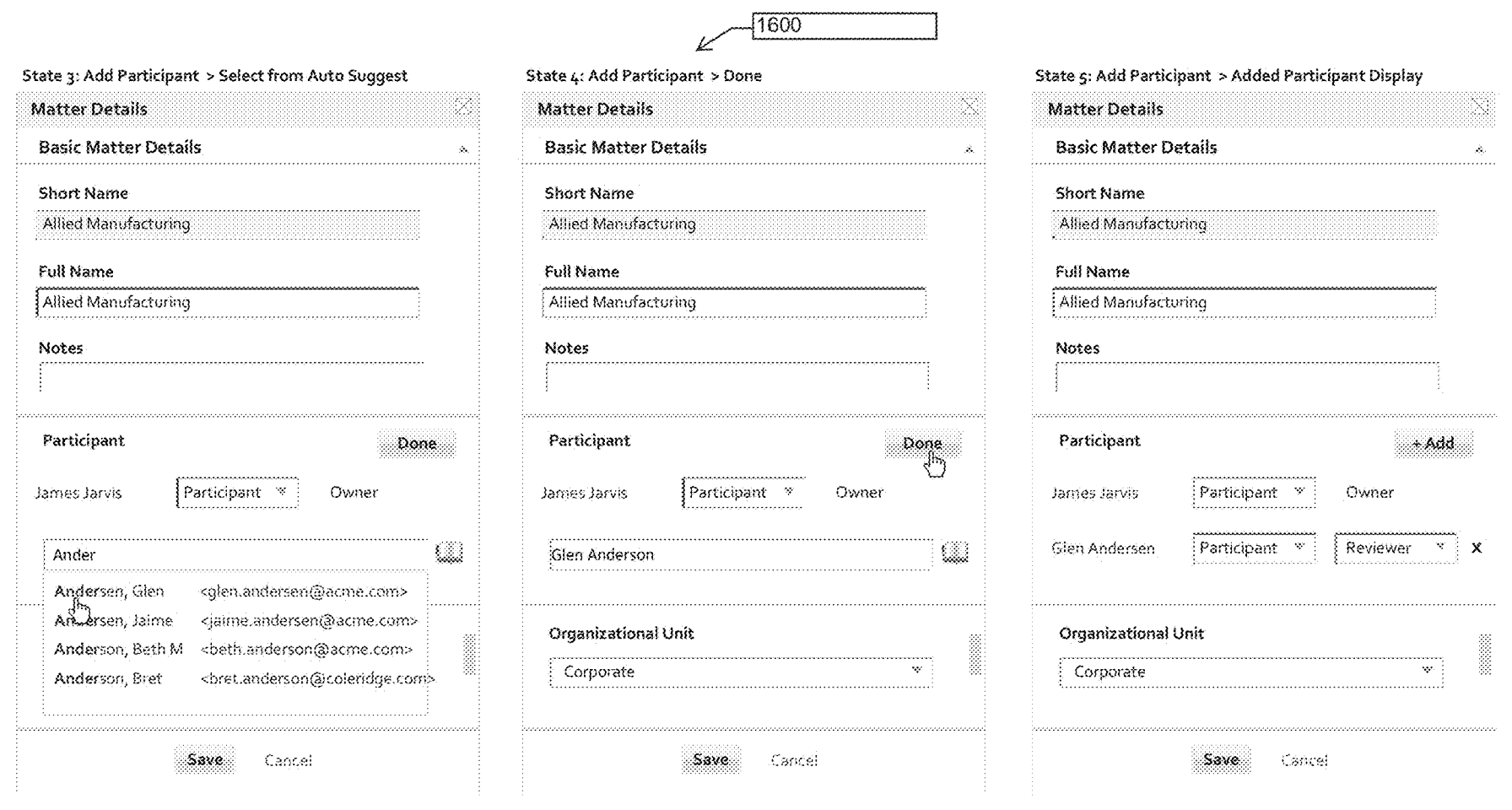
Figure 18:
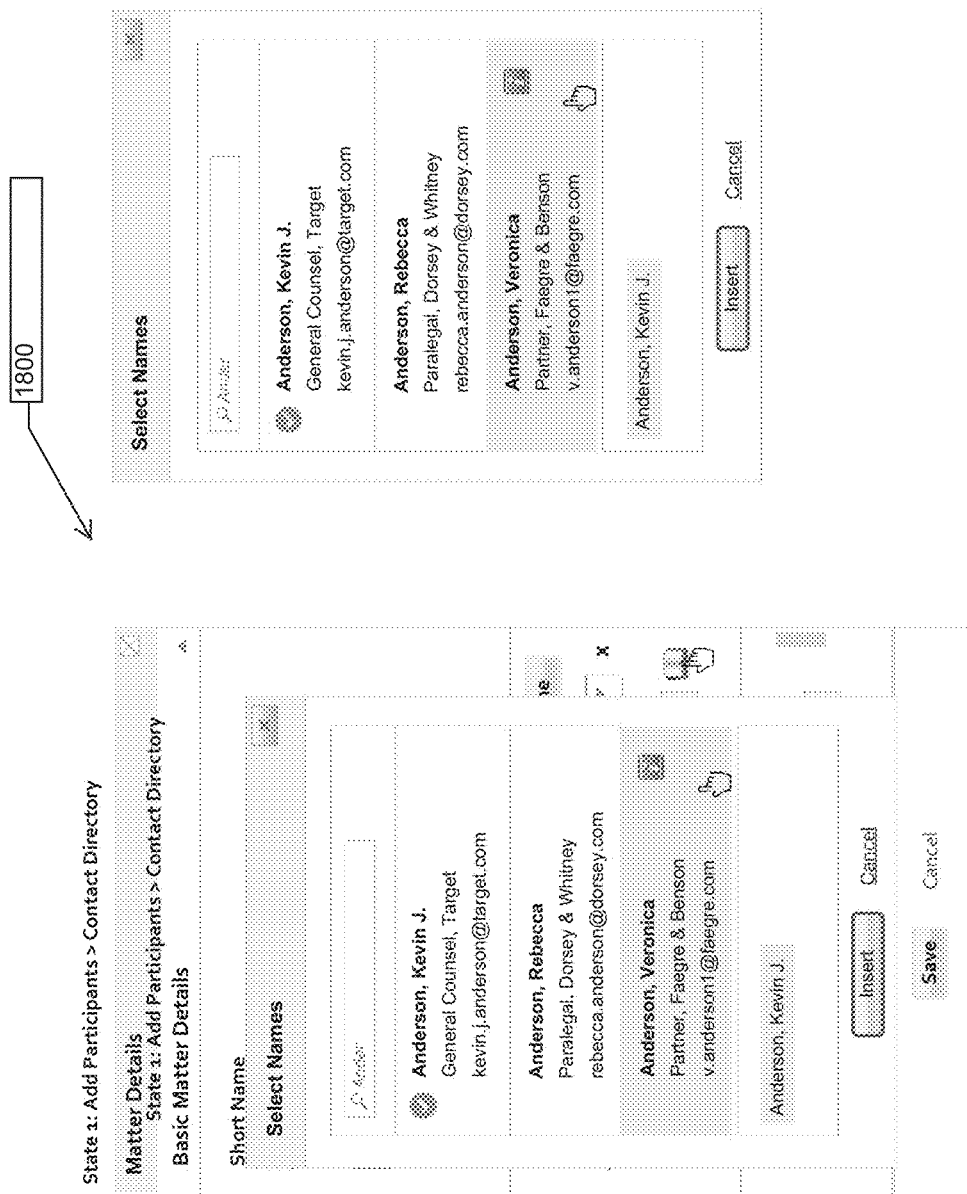
Figure 19:
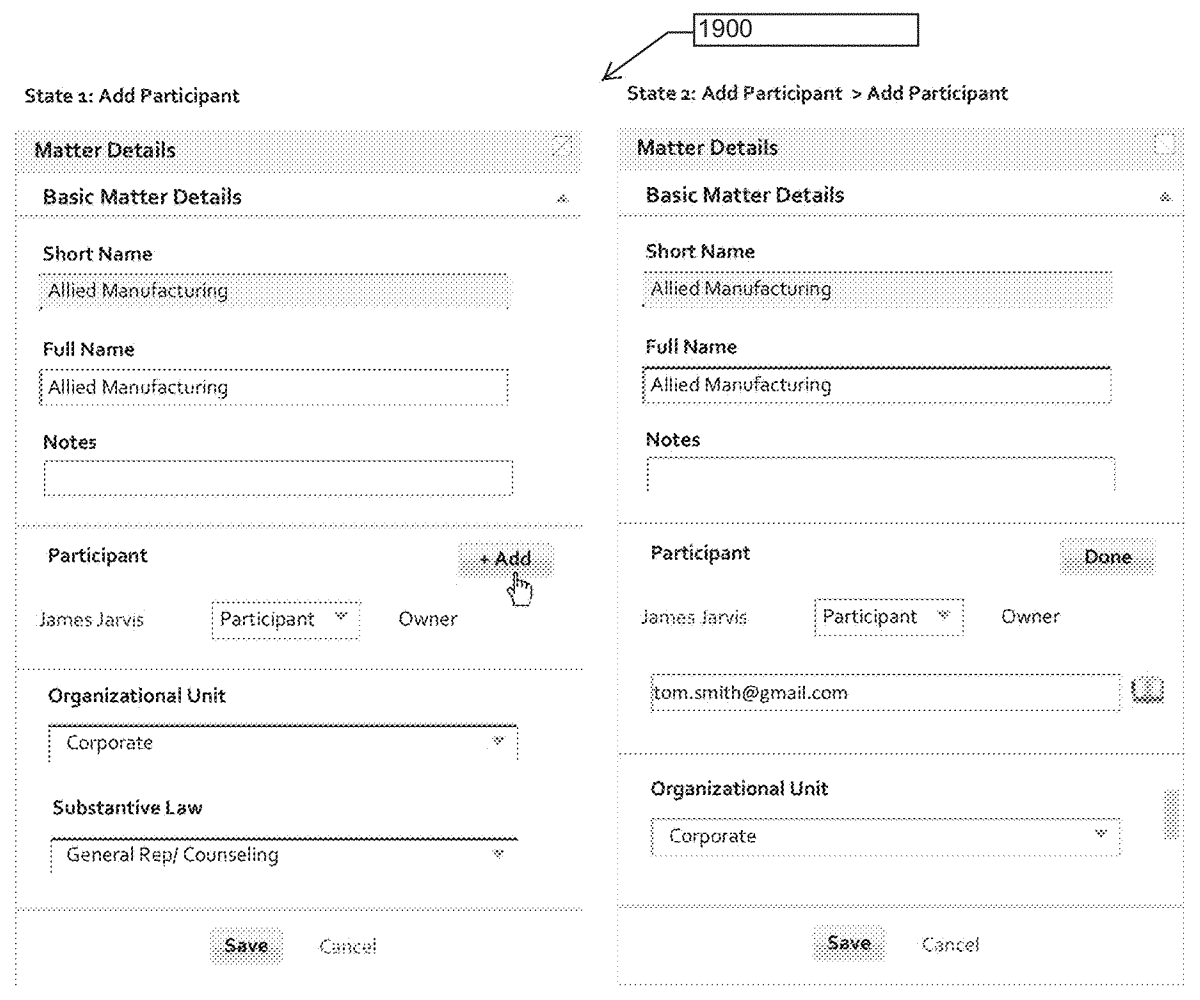
Figure 20:
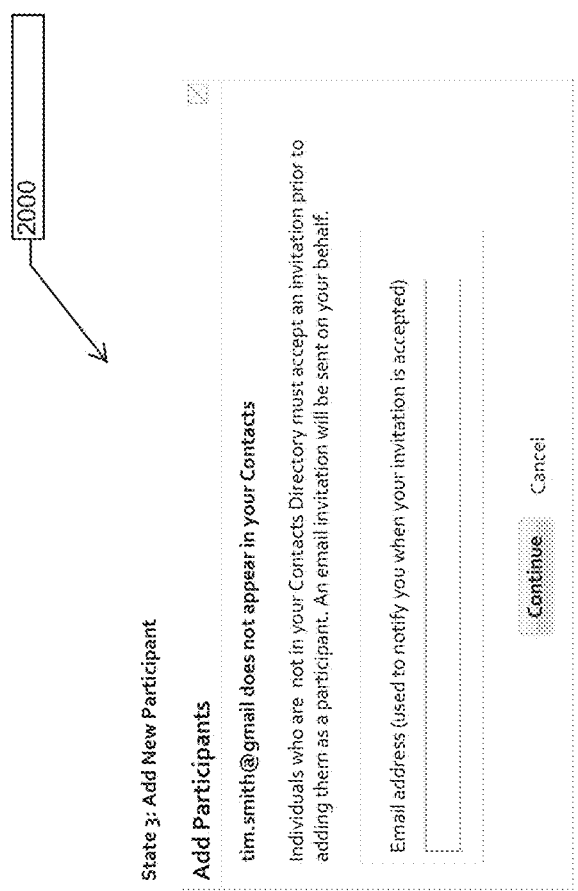
Figure 21:
Figure 22:
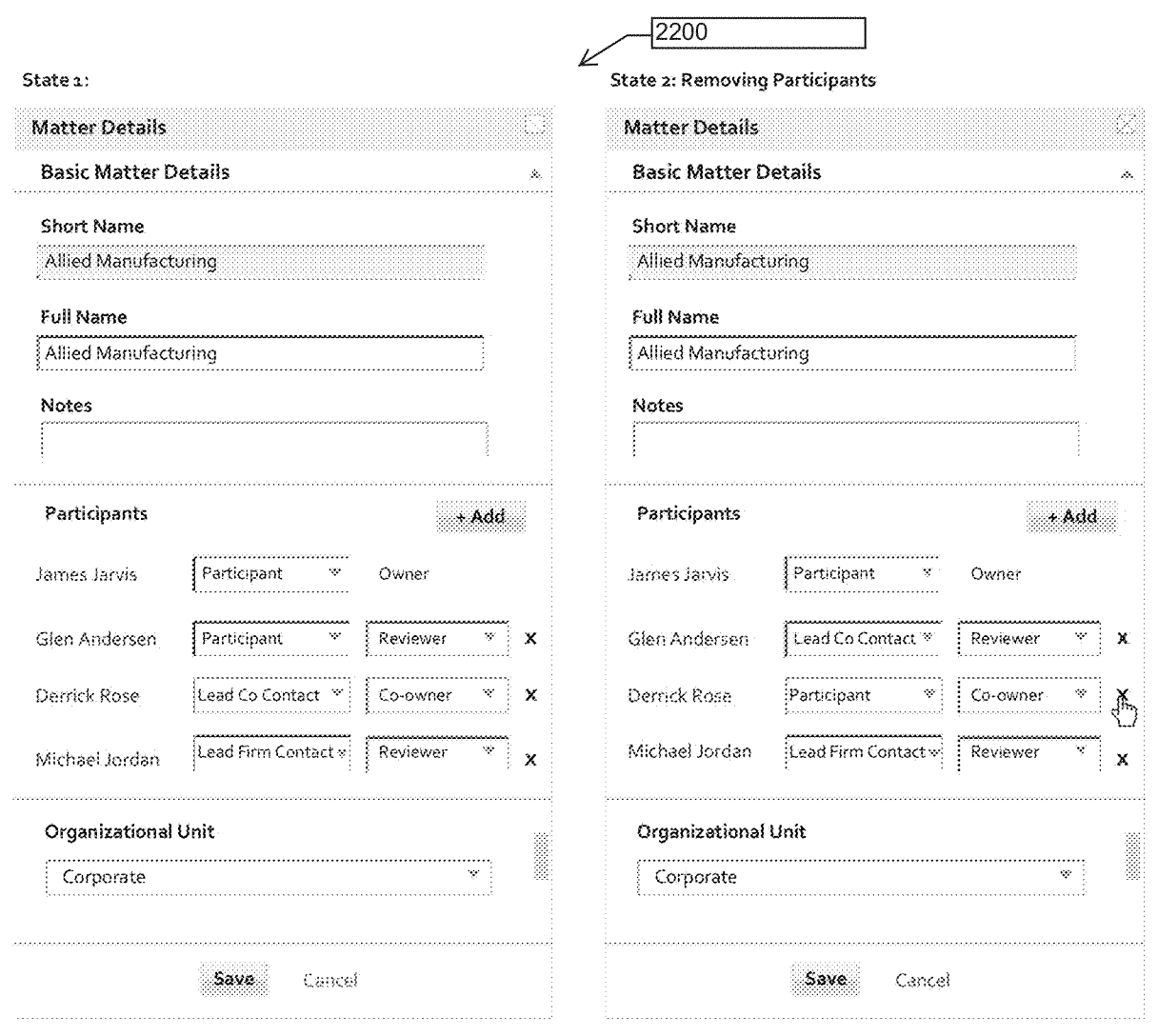

FIGS. 15-22 illustrate interfaces for adding and removing participants from workbench 1120. In particular, FIGS. 15-17 represent interfaces for adding a participant using an auto suggest feature. For example, in FIG. 15, interface 1500 shows an "Add" button which the user may select and a text search box appears. In FIGS. 15-16, the interfaces show a user beginning to type a name when several matches start to automatically appear. This auto suggest function allows the user to select the participant if that participant is already within the auto suggest listing. Furthermore, in FIG. 16, interface 1600 shows that the user may first select the participant and then select the "Done" button. Next, the roles need to be assigned to each participant. For example, in FIG. 17, interface 1700 shows drop-down boxes residing next to each individual. The user may choose to edit these roles at any time. The roles may include the relationship to the case (e.g., lead firm contact) and/or the access level to documents (i.e., a reviewer may only be able to review documents and not be allowed to edit). FIG. 18 shows an interface 1800 for adding a participant from a contacts directory within the workbench 1120. As described in FIG. 15, a text search box appears. In addition, an icon representing an address book is located to the right of the text search box in FIG. 18. When the user selects the address book icon, in FIG. 18, the listing of contacts within a directory appears and a user may search for someone within this directory to add to the list of participants. FIGS. 19-21 represent interfaces for manually adding a participant to the workbench 1120. In FIG. 19, the interface 1900 shows that the user may select the "Add" button and a text search box appears. Next, the interface shows the user has typed in the email address "tom.smith@gmail.com." The user selects the "Done" button. Once the "Done" button is selected, in FIG. 20, interface 2000 displays a message notifying the user that the individual must accept the invitation prior to adding them as a participant. FIG. 21 shows an interface 2100 representing the "Tom Smith" invitation as pending. The addition of Tom Smith remains pending until Tom accepts the invitation. The status may be monitored on this interface. FIG. 22 illustrates an interface 2200 for removing a participant. Next to each participant name row is an "X" icon. A user may select this icon to remove the participants name from the given matter.

Figure 23:
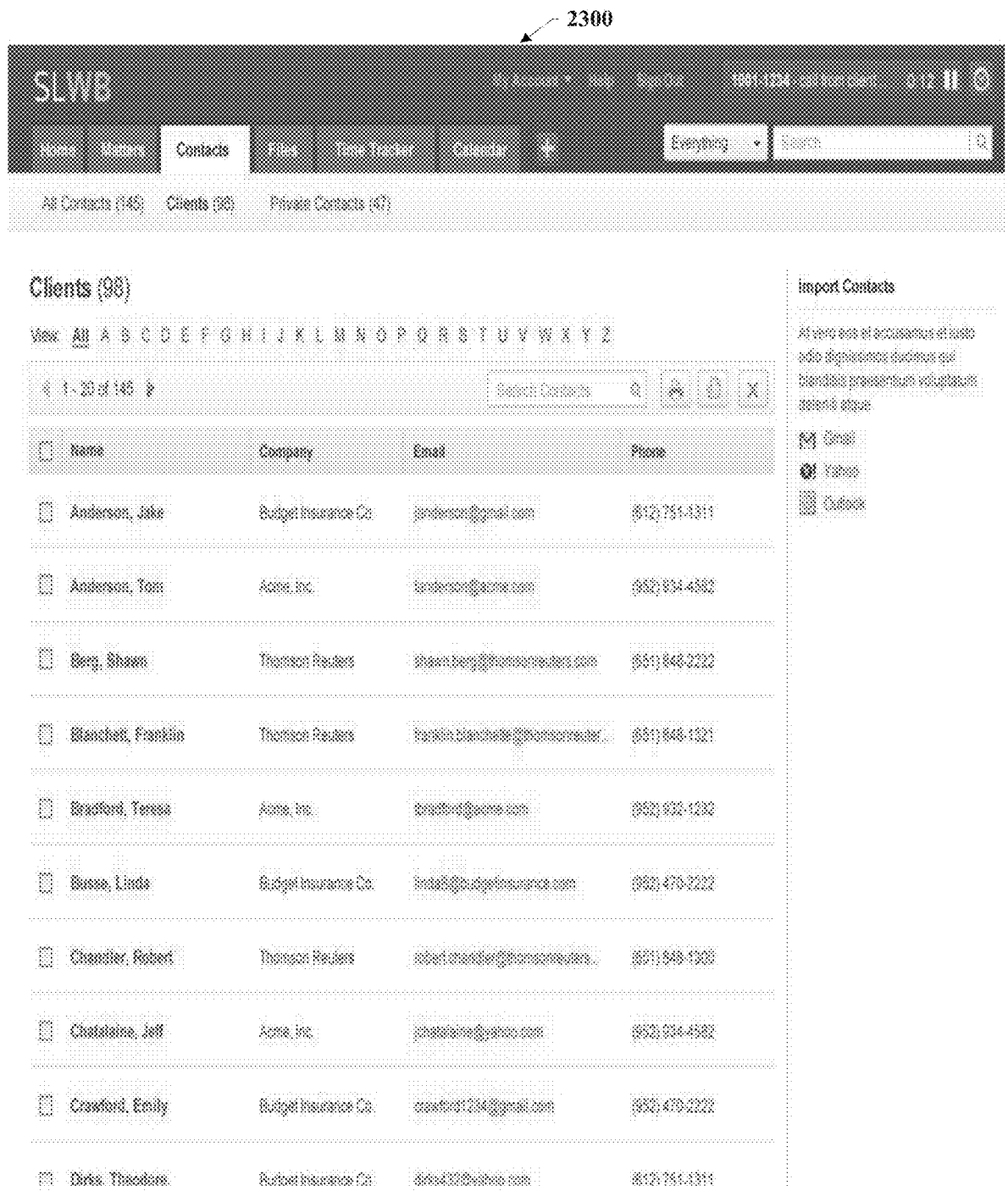

FIG. 23 depicts an interface 2300 of a listing of contacts within workbench 1120. The user navigates to this interface by selecting the "Contacts" tab towards the top of screen. In this instance, the user has selected to view only the client contacts. In addition, on the right portion of the interface is an option to import contacts from various different sources.

Figure 24:
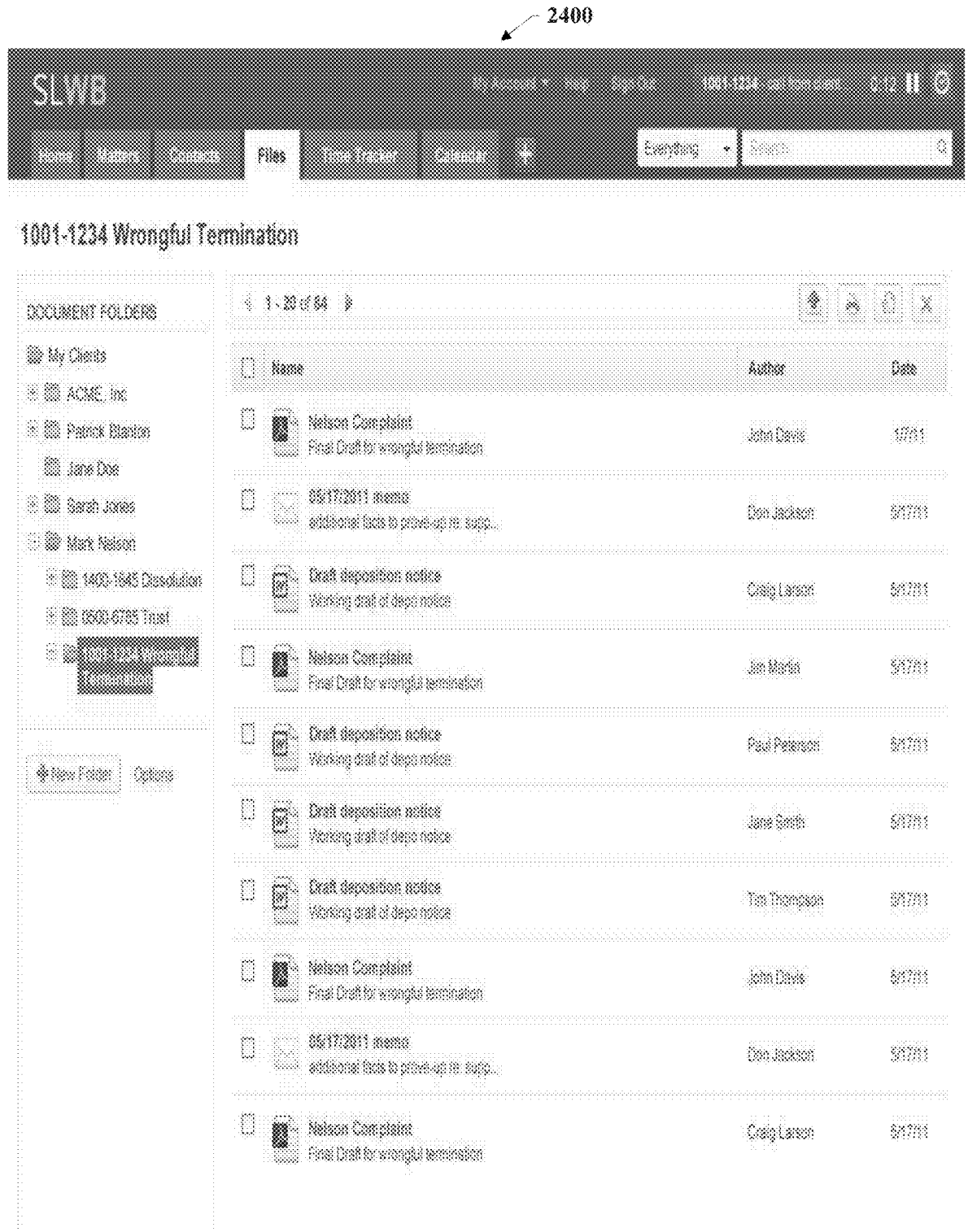

FIG. 24 exemplifies an interface 2400 of a listing of file within workbench 1120. The user navigates to this interface by selecting the "Files" tab towards the top of screen. In this interface, the user has chosen to view files within a folder entitled "1001-1234 Wrongful Termination." A user may select any file to view. In addition the user also has several delivery options located above the date field. These options include printing, downloading, and/or emailing located above the date field.

Figure 25:

FIG. 25 illustrates a set of three exemplary interfaces 2500 of listing, accessing and viewing files on a mobile access device. Folder listing interface 2510 includes a listing of the user's folder within workbench 1120. Individual folder interface 2520 includes a listing of the files located within a folder entitled "Mark Nelson Folder." The user navigates to individual folder interface 2520 by selecting the folder "Mark Nelson" from the folder listing interface 2510. If a user would like to view a file while on the mobile access device, file interface 2530 would be displayed to the user. As stated previously, work product management system 140 provides synchronization between access devices so that all data, including folders, remains updated.

Figure 26:
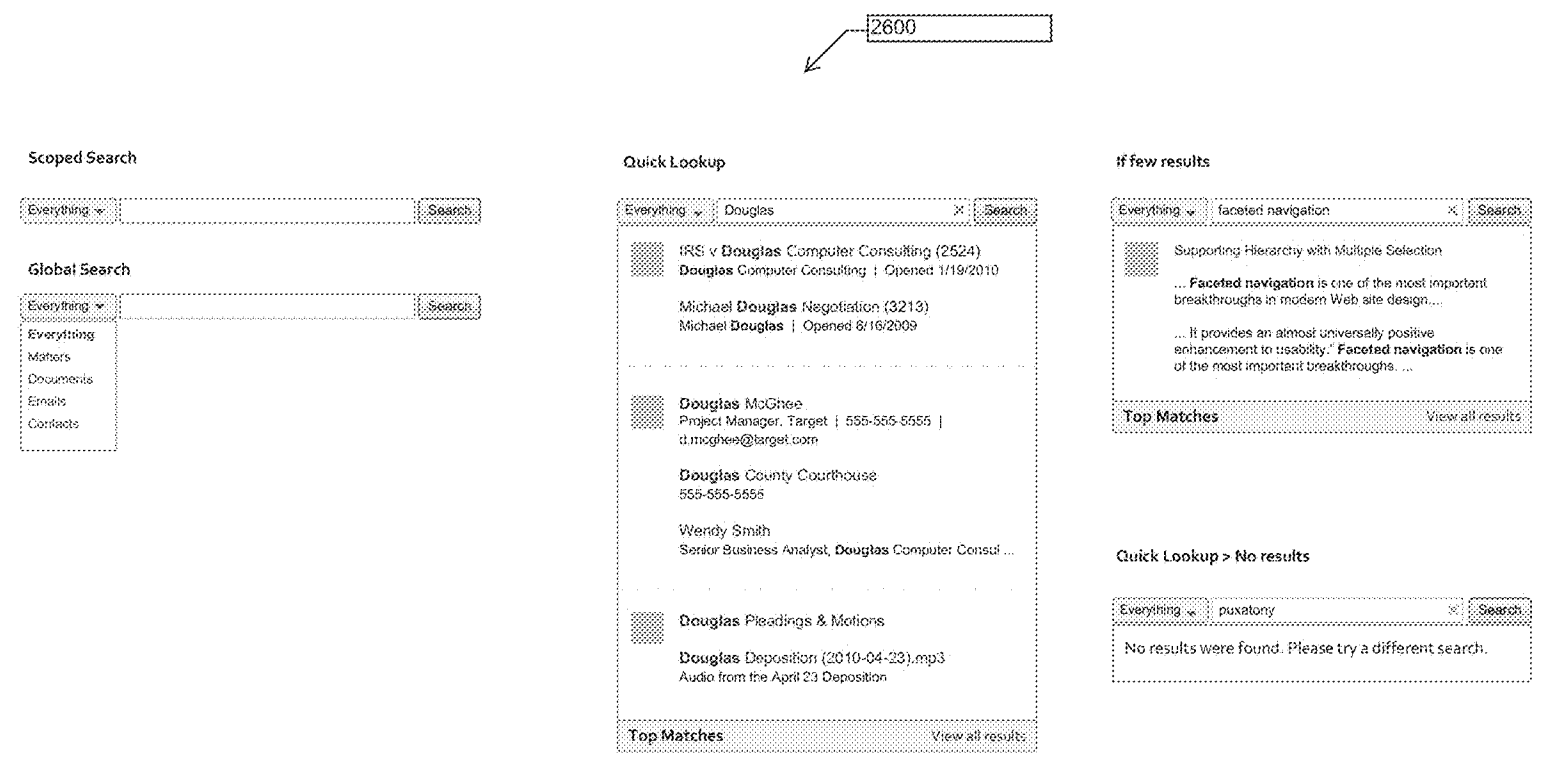
Figure 28:
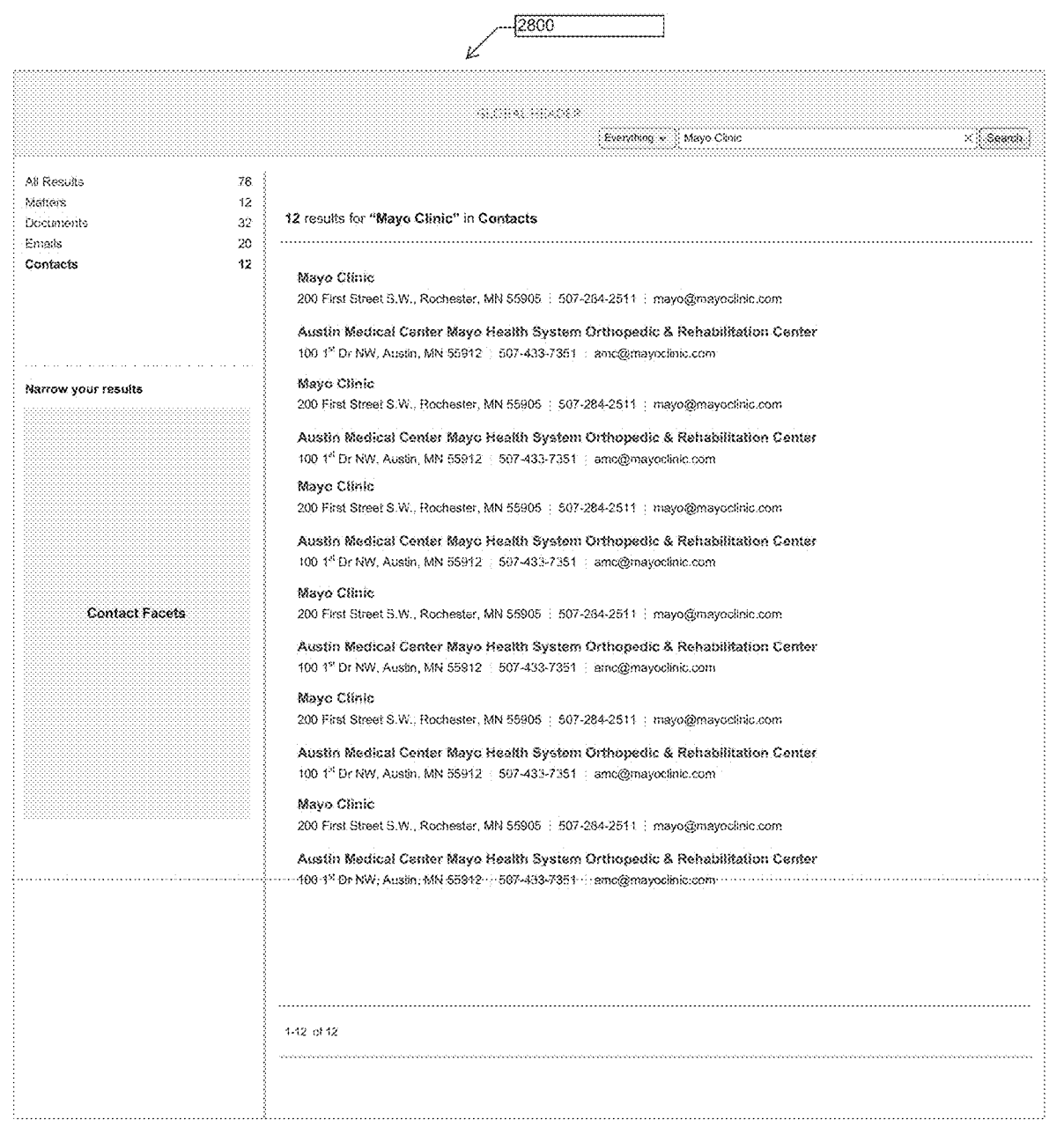
Figure 29:
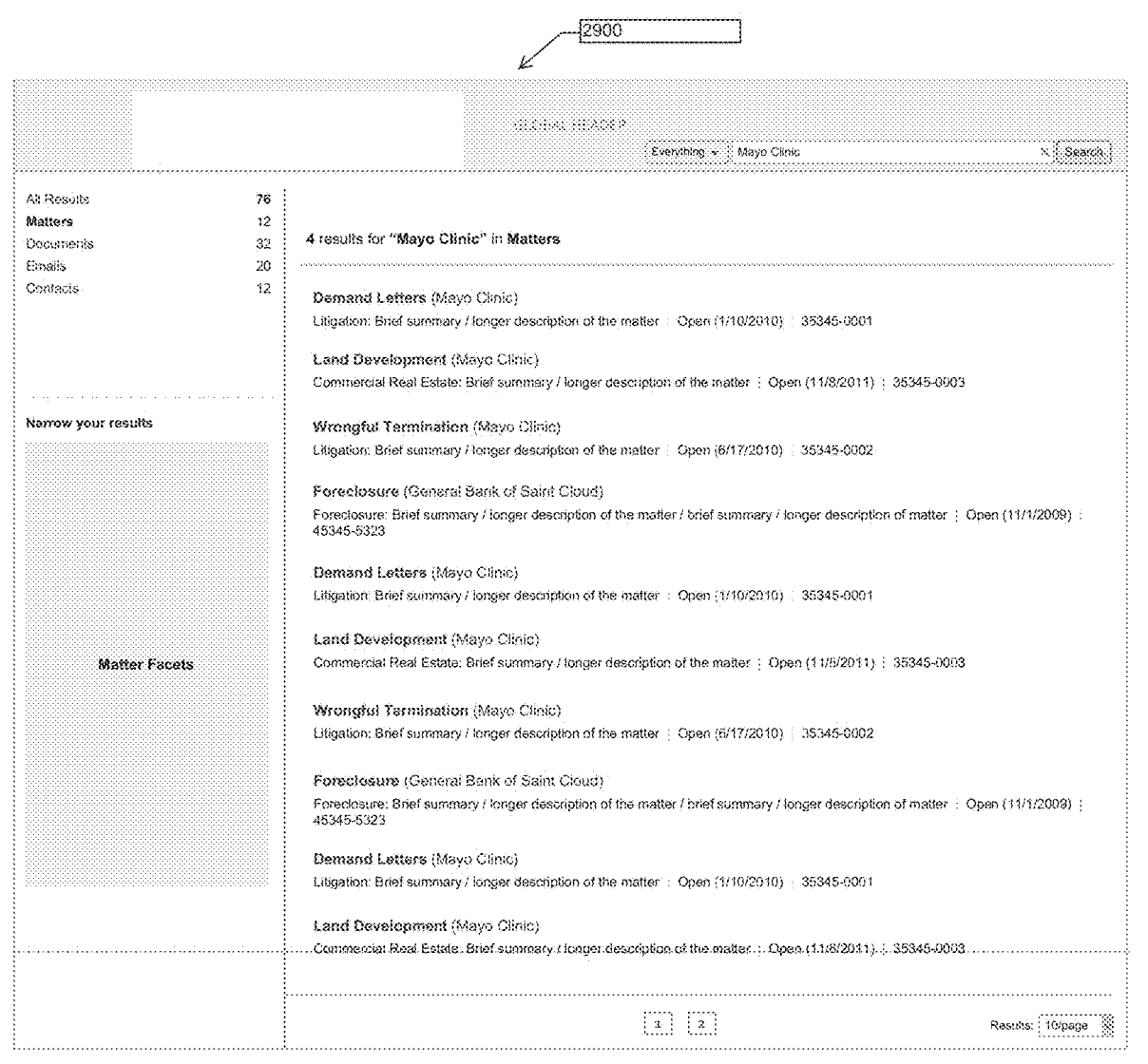
Figure 31:
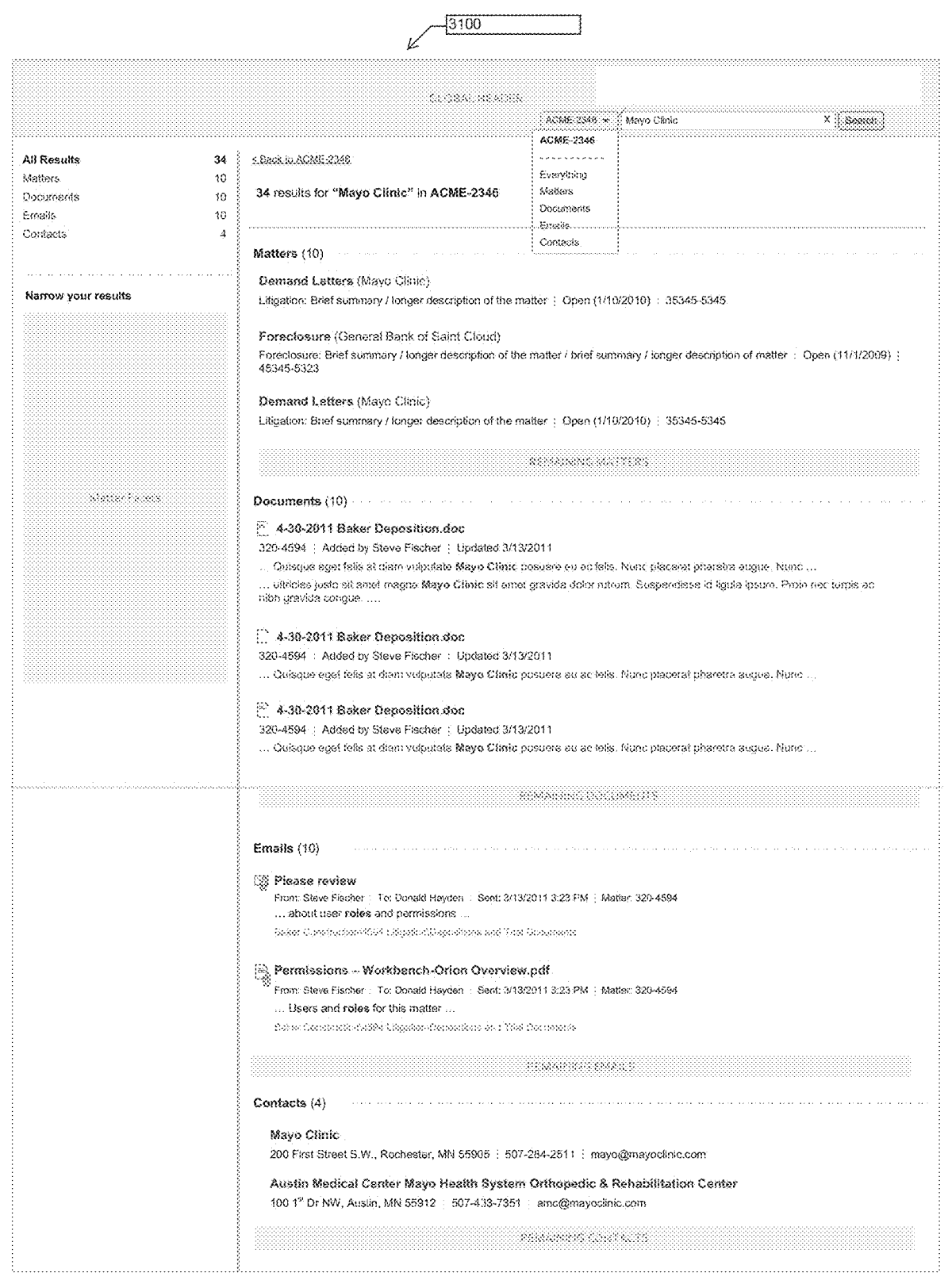
Figure 32:
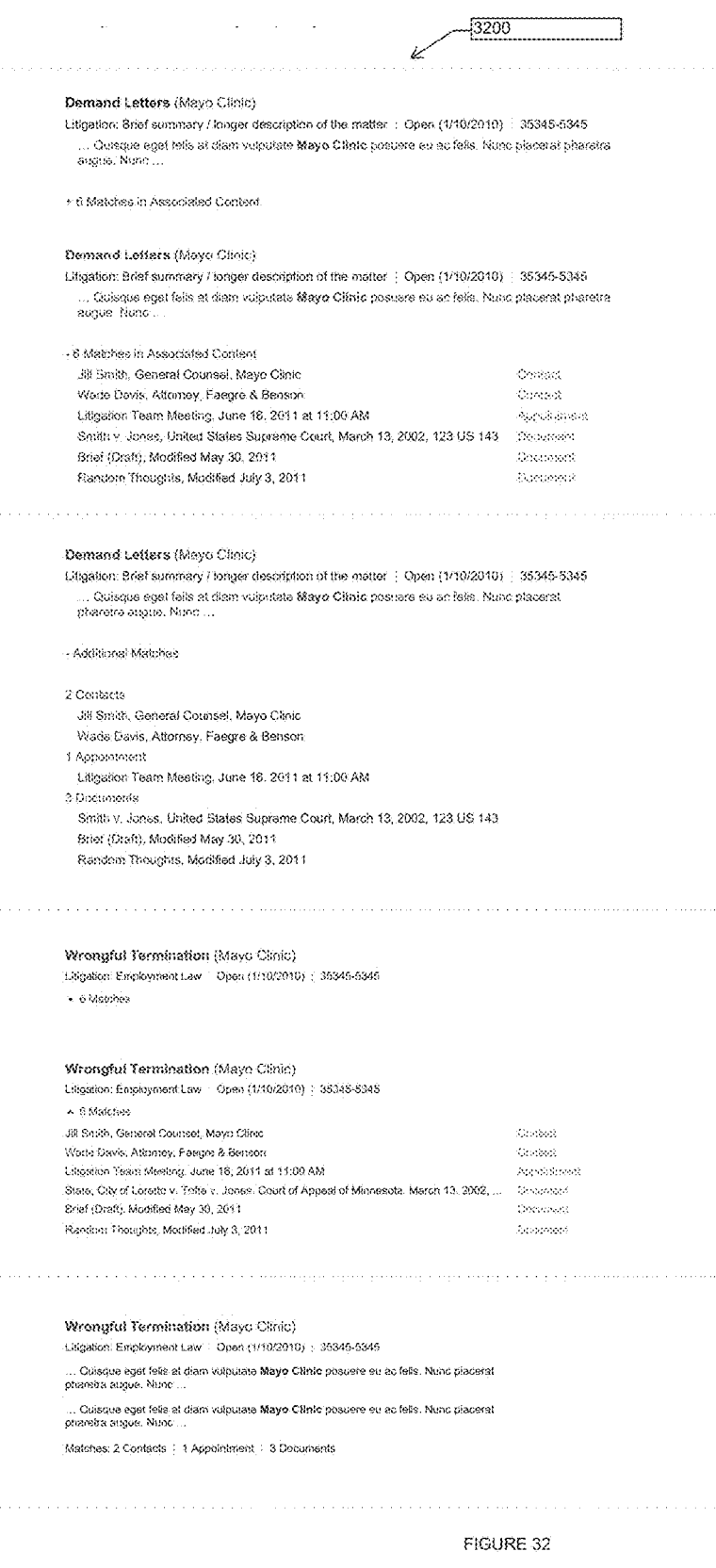

FIGS. 26-32 show the search box and search results interfaces within workbench 1120. For example, FIG. 26 illustrates exemplary search box interface 2600. One exemplary search box allows a user to start typing and results begin to display. Another search box allows a user to start type and then select where to search (e.g., everything, matters, documents, emails, and/or contacts). Once the user has submitted the user query, a set of results are displayed to the user. These results may be further filtered by entering additional filters/facets to the query. FIG. 27 shows an exemplary interface 2700 of all the results for the given query "Mayo Clinic." From here a user may choose to narrow the results by selecting a category and/or by selecting a file to view. FIGS. 28-30 depict contacts category result interface 2800, matters category result interface 2900, and documents category result interface 3000. In addition, the user may want to search only within a given matter, for example in FIG. 31, ACME-2346. In FIG. 31, the interface 3100 shows a set of results from the query "Mayo Clinic" only within matter ACME-2346. In some embodiments, the user may want to see the context around the query to determine which file to choose. In FIG. 32, the interface 3200 depicts a more detailed result set with the context around an instance of the query.

Figure 34:
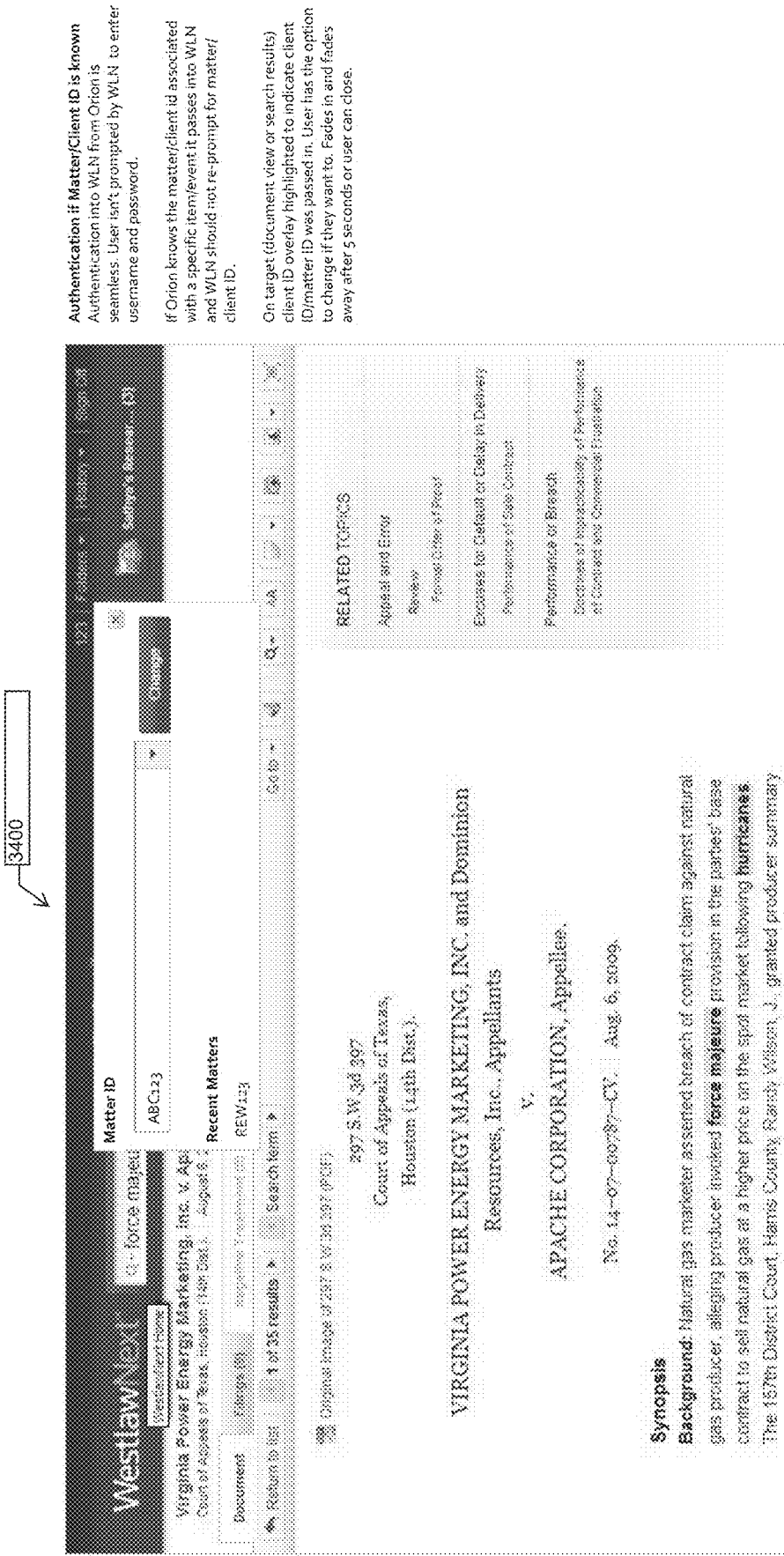

FIGS. 33-34 exemplify interfaces for an online legal research widget 4520 within workbench 1120. In particular, FIG. 33 illustrates an interface 3300 for the online legal research widget 4520 and a listing of research and files. This research could have been done within the workbench 1120 or within the standalone online legal research product. If the research is done within the standalone product, the work product management system 140 synchronizes the data between the workbench 1120 and the standalone product. Either way, a user may select a file to view, select a previous query, and/or execute a new query. If the user chooses to select a previous query and/or execute a new query, the standalone online legal research product is launched, preferably in a new browser window. FIG. 34 displays an interface 3400 of the standalone online legal research product wherein the user selected to view a previous query. Authentication into the standalone product from workbench 1120 is seamless. The user is not prompted by the online legal research product, for example, to enter a username and password. The workbench 1120 knows this information and verifies it using the security example described earlier. In addition, the workbench 1120 also knows the matter the user is working on and this too may be passed on to the online legal research product in order to allow the user to bill the proper client.

Figure 36:

FIGS. 35-36 display interfaces relating to notifications widget 4560 within workbench 1120. In FIG. 35, interface 3500 includes a listing of all the notifications across all the matters within a user's workbench. The user has the option to select the notification to complete the task that is associated with it or to dismiss the notification. In FIG. 36, interface 3600 depicts a listing of notifications within a given matter, for example, JA Wrongful Dismissal.

Figure 37:
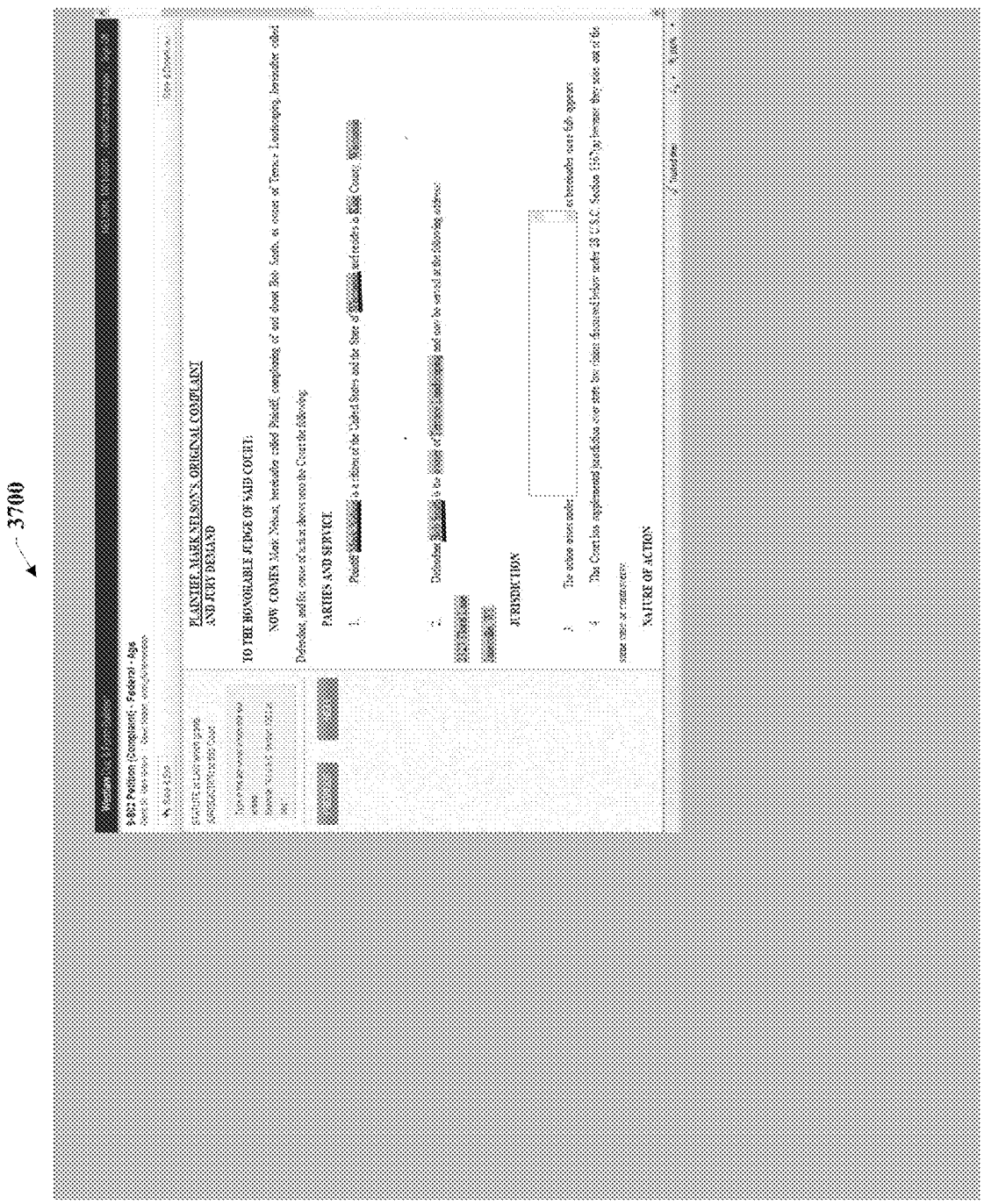

FIG. 37 illustrates an interface 3700 relating to an exemplary enhanced electronic file. The exemplary enhanced electronic file includes underlined text. In one instance, the underlined text may be from the entity name resolution program described earlier. In another instance, since this enhanced electronic file is also afield-oriented electronic file, the underlined text may be a set of metadata that was extracted from a different electronic file within the same work product. At least one field is then populated with the set of metadata, into the field-oriented electronic file, to create an enhanced electronic file. In other words, since the workbench 1120 recognizes the user is within a certain work product (e.g. 1001-1234 Wrongful termination legal matter), the workbench 1120 may request data from the repository module 140b to populate a field within the field-oriented electronic file with a set of metadata.

The embodiments described above and in the claims are intended only to illustrate and teach one or more ways of practicing or implementing the present invention, not to restrict its breadth or scope. For example, FIG. 1 shows work product management system 140 as residing within server 120. Other embodiments may logically and/or physically separate parts of the work product management system to reside and/or execute on multiple servers similar in function to server 120. Another example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

What is claimed is:

1. A computer implemented method comprising:
receiving at a server an initial electronic file uploaded from an access device in communication with the server over a transmission channel, the initial electronic file associated with a work product presented by a user;
determining an electronic file content type associated with the initial electronic file by analyzing the structure and content of the electronic file, wherein the electronic file content type is at least one of a contract, a legal motion document, a legal brief, a settlement agreement, an email, and a memorandum;
executing by the sever at least one subscription program associated with the electronic file content type of the initial electronic file and generating an enhanced electronic file version of the initial electronic file, the at least one subscription program comprising a program that the user has a subscription to, is selected by the server for execution against the initial electronic file from a plurality of subscription programs based on the determined file content type of the initial electronic file, and upon execution against the initial electronic file adds at least one enhancement to the initial electronic file, wherein the at least one enhancement comprises a hyperlink and wherein the at least one subscription program adds at least one hyperlink to the initial electronic file, the enhanced electronic file being associated with an indication of completion of the at least one subscription program;

retrieving at least one enhanced electronic file based on a matter security level, the matter security level comprising customized access permissions for the enhanced electronic file;

extracting a set of metadata from the initial electronic file, the set of metadata comprising jurisdictional data and one or more of a party name and an entity name;

storing the set of metadata from the initial electronic file in a memory in association with the work product; and populating with the set of metadata at least one field within a field-oriented electronic file associated with the work product upon initial generation of the field-oriented electronic file.

2. The method of claim 1 wherein the work product is a litigation matter.

3. The method of claim 1 wherein the work product is a transactional matter.

4. The method of claim 1 wherein the enhanced electronic file is at least one of an enhanced word processing document, an enhanced spreadsheet, an enhanced audio file, an enhanced video file, an enhanced image file, an enhanced text document, an enhanced field-oriented file, and an enhanced text associated with an image.

5. The method of claim 1 wherein the at least one field is a party name field.

6. The method of claim 1 wherein the at least one field is a court jurisdiction field.

7. A work product management system comprising:

a server including a processor and a memory coupled to the processor and storing instructions thereon that, in response to receiving a request to manage a work product, cause the processor to:

receive at a server an initial electronic file uploaded from an access device in communication with the server over a transmission channel, the initial electronic file associated with a work product presented by a user;

determine an electronic file content type associated with the initial electronic file by analyzing the structure and content of the electronic file, wherein the electronic file content type is at least one of a contract, a legal motion document, a legal brief, a settlement agreement, an email, and a memorandum;

execute by the sever at least one subscription program associated with the electronic file content type of the initial electronic file and generate an enhanced electronic file version of the initial electronic file, the at least one subscription program comprising a program that the user has a subscription to, is selected by the server for execution against the initial electronic file from a plurality of subscription programs based on the determined file content type of the initial electronic file, and upon execution against the initial electronic file adds at least one enhancement to the initial electronic file, wherein the at least one enhancement comprises a hyperlink and wherein the at least one subscription program adds at least one hyperlink to the initial electronic file, the enhanced electronic file being associated with an indication of completion of at the least one subscription program;

retrieve at least one enhanced electronic file based on a matter security level, the matter security level comprising customized access permissions for the enhanced electronic file;

extract a set of metadata from the initial electronic file, the set of metadata comprising jurisdictional data and one or more of a party name and an entity name;

store the initial electronic file and the set of metadata from the initial electronic file in the memory in association with the work product; and populate the set of metadata at least one field within a field-oriented electronic file associated with the work product upon initial generation of the field-oriented electronic file.

8. The system of claim 7 wherein the work product is a litigation matter.

9. The system of claim 7 wherein the work product is a transactional matter.

10. The system of claim 7 wherein the enhanced electronic file is at least one of an enhanced word processing document, an enhanced spreadsheet, an enhanced audio file, an enhanced video file, an enhanced image file, an enhanced text document, an enhanced field-oriented file, and an enhanced text associated with an image.

11. The system of claim 7 wherein the at least one field is a party name field.

12. The system of claim 7 wherein the at least one field is a court jurisdiction field.

13. A non-transitory computer-usable medium having a computer readable internet restriction program embodied therein, the computer readable internet restriction program comprising:

a first set of computer code configured to receive at a server an initial electronic file uploaded from an access device in communication with the server over a transmission channel, the initial electronic file associated with a work product presented by a user;

a second set of computer code configured to determine an electronic file content type associated with the initial electronic file by analyzing the structure and content of the electronic file, wherein the electronic file content type is at least one of a contract, a legal motion document, a legal brief, a settlement agreement, an email, and a memorandum;

a third set of computer code configured to, execute by the sever at least one subscription program associated with the electronic file content type of the initial electronic file and generate an enhanced electronic file version of the initial electronic file, the at least one subscription program comprising a program that the user has a subscription to, is selected by the server for execution against the initial electronic file from a plurality of subscription programs based on the determined file content type of the initial electronic file, and upon execution against the initial electronic file adds at least one enhancement to the initial electronic file, wherein the at least one enhancement comprises a hyperlink and wherein the at least one subscription program adds at least one hyperlink to the initial electronic file, the enhanced electronic file being associated with an indication of completion of the at least one subscription program;

a fourth set of computer code configured to retrieve at least one enhanced electronic file based on a matter security level, the matter security level comprising customized access permissions for the enhanced electronic file;

a fifth set of computer code configured to extract a set of metadata from the initial electronic file, the set of metadata comprising jurisdictional data and one or more of a party name and an entity name;

a sixth set of computer code configured to store the initial electronic file and the set of metadata from the initial electronic file in the memory in association with the work product; and a seventh set of computer code configured to populate the set of metadata at least one field within a field-oriented electronic file associated with the work product upon initial generation of the field-oriented electronic file.

14. The non-transitory computer-usable medium of claim 13 wherein the work product is a litigation matter.

15. The non-transitory computer-usable medium of claim 13 wherein the work product is a transactional matter.

16. The non-transitory computer-usable medium of claim 13 wherein the enhanced electronic file is at least one of an enhanced word processing document, an enhanced spreadsheet, an enhanced audio file, an enhanced video file, an enhanced image file, an enhanced text document, an enhanced field-oriented and an enhanced text associated with an image.

17. The non-transitory computer-usable medium of claim 13 wherein the at least one field is a party name field.

18. The non-transitory computer-usable medium of claim 13 wherein the at least one field is a court jurisdiction field.

19. The method of claim 1 wherein the at least one hyperlink links to a case cited within the initial electronic file.

* * * * *